United States Patent
Saatchi

(10) Patent No.: US 11,580,839 B2
(45) Date of Patent: Feb. 14, 2023

(54) SYSTEMS, METHODS, AND APPARATUSES FOR IMPLEMENTING A GPS DIRECTIONAL SWIMMING WATCH FOR THE EYESIGHT IMPAIRED

(71) Applicant: Amirbahman Saatchi, Portland, OR (US)

(72) Inventor: Amirbahman Saatchi, Portland, OR (US)

( * ) Notice: Subject to any disclaimer, the term of this patent is extended or adjusted under 35 U.S.C. 154(b) by 192 days.

(21) Appl. No.: 17/184,423

(22) Filed: Feb. 24, 2021

(65) Prior Publication Data

US 2021/0327248 A1     Oct. 21, 2021

Related U.S. Application Data

(60) Provisional application No. 62/980,971, filed on Feb. 24, 2020.

(51) Int. Cl.
| | |
|---|---|
| *G08B 21/08* | (2006.01) |
| *A63B 31/00* | (2006.01) |
| *G09B 21/00* | (2006.01) |
| *G08B 6/00* | (2006.01) |

(52) U.S. Cl.
CPC ............ *G08B 21/088* (2013.01); *A63B 31/00* (2013.01); *G08B 6/00* (2013.01); *G09B 21/00* (2013.01)

(58) Field of Classification Search
CPC ........ G08B 21/088; G08B 6/00; A63B 31/00; G09B 21/00
USPC ..................................................... 340/573.6
See application file for complete search history.

(56) References Cited

U.S. PATENT DOCUMENTS

| | | | |
|---|---|---|---|
| 10,496,104 B1* | 12/2019 | Liu ......................... | G06T 5/006 |
| 2017/0227573 A1* | 8/2017 | Theytaz .................. | G01P 21/00 |
| 2018/0122043 A1* | 5/2018 | Energin .................. | G06F 3/017 |
| 2019/0182415 A1* | 6/2019 | Sivan ..................... | G06F 3/013 |

(Continued)

*Primary Examiner* — Jack K Wang
(74) *Attorney, Agent, or Firm* — Elliott, Ostrander & Preston, P.C.

(57) ABSTRACT

In accordance with embodiments disclosed herein, there are provided systems, methods, and apparatuses for implementing a GPS directional swimming watch for the eyesight impaired. For example, according to one embodiment there is a wearable navigational apparatus including: a mechanical input to receive coordinates for a first location located at an end of a first fixed segment originating from an starting point in a first single cardinal direction; a mechanical input to receive coordinates for a second location located at the end of a second fixed segment originating from the first location in a second single cardinal direction perpendicular to the first cardinal direction, in which the first and second fixed segments form a selected route; a haptic feedback motor having a magnetized compass integrated therein to signal a wearer directional information relative to the first and second locations set, in which the hepatic feedback motor signals the wearer to change direction upon any of: (i) reaching the first location, (ii) reaching the second location, and (iii) deviating from any point along the selected route during bidirectional navigation; and a return function to signal to the wearer, via the haptic feedback motor, directional information relative to the starting point from any point along the selected course. Other related embodiments are described.

20 Claims, 25 Drawing Sheets

(56) References Cited

U.S. PATENT DOCUMENTS

| | | | | |
|---|---|---|---|---|
| 2019/0377473 A1* | 12/2019 | Osman | .................... | A63F 13/25 |
| 2020/0088997 A1* | 3/2020 | Lee | .................... | G02B 27/0176 |
| 2021/0051440 A1* | 2/2021 | de la Broise | ........... | G01S 13/46 |
| 2021/0072535 A1* | 3/2021 | Shin | ........................ | G06F 3/011 |
| 2021/0333549 A1* | 10/2021 | Jo | ........................ | G02B 6/0016 |

\* cited by examiner

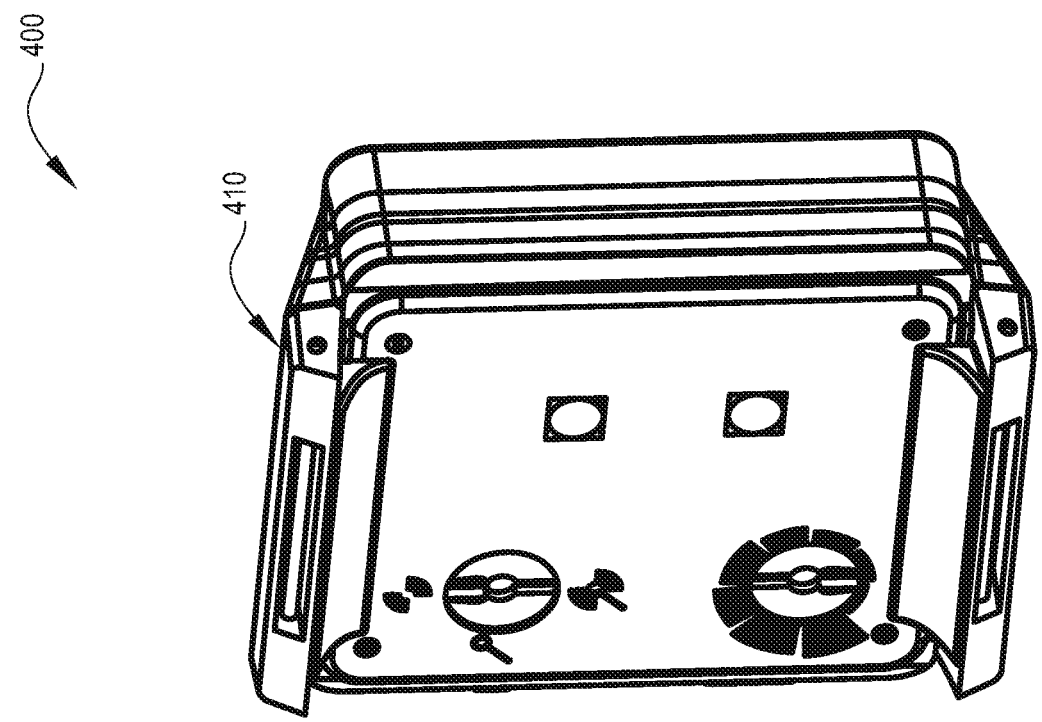
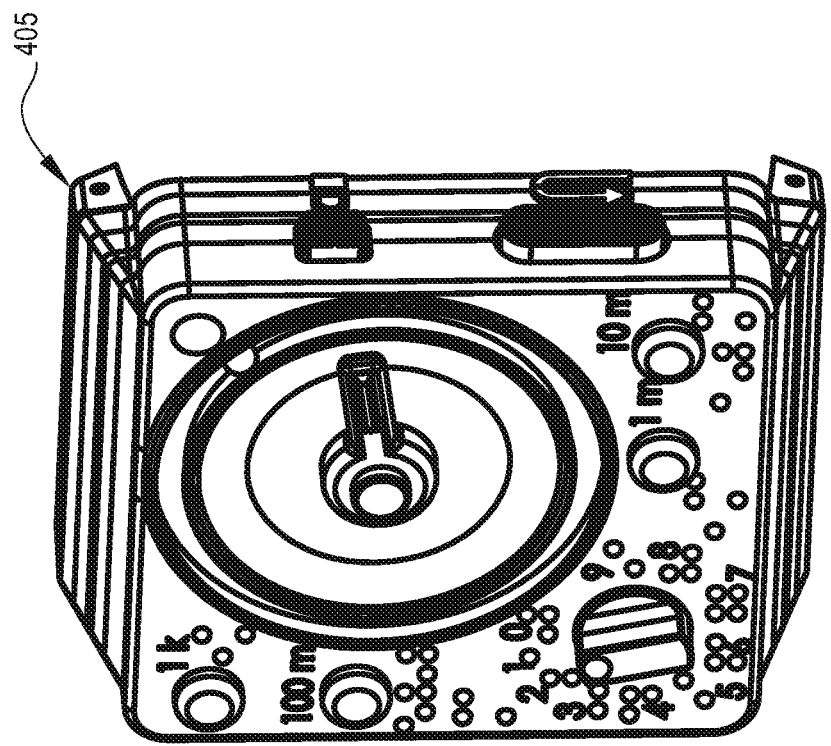
Fig. 4

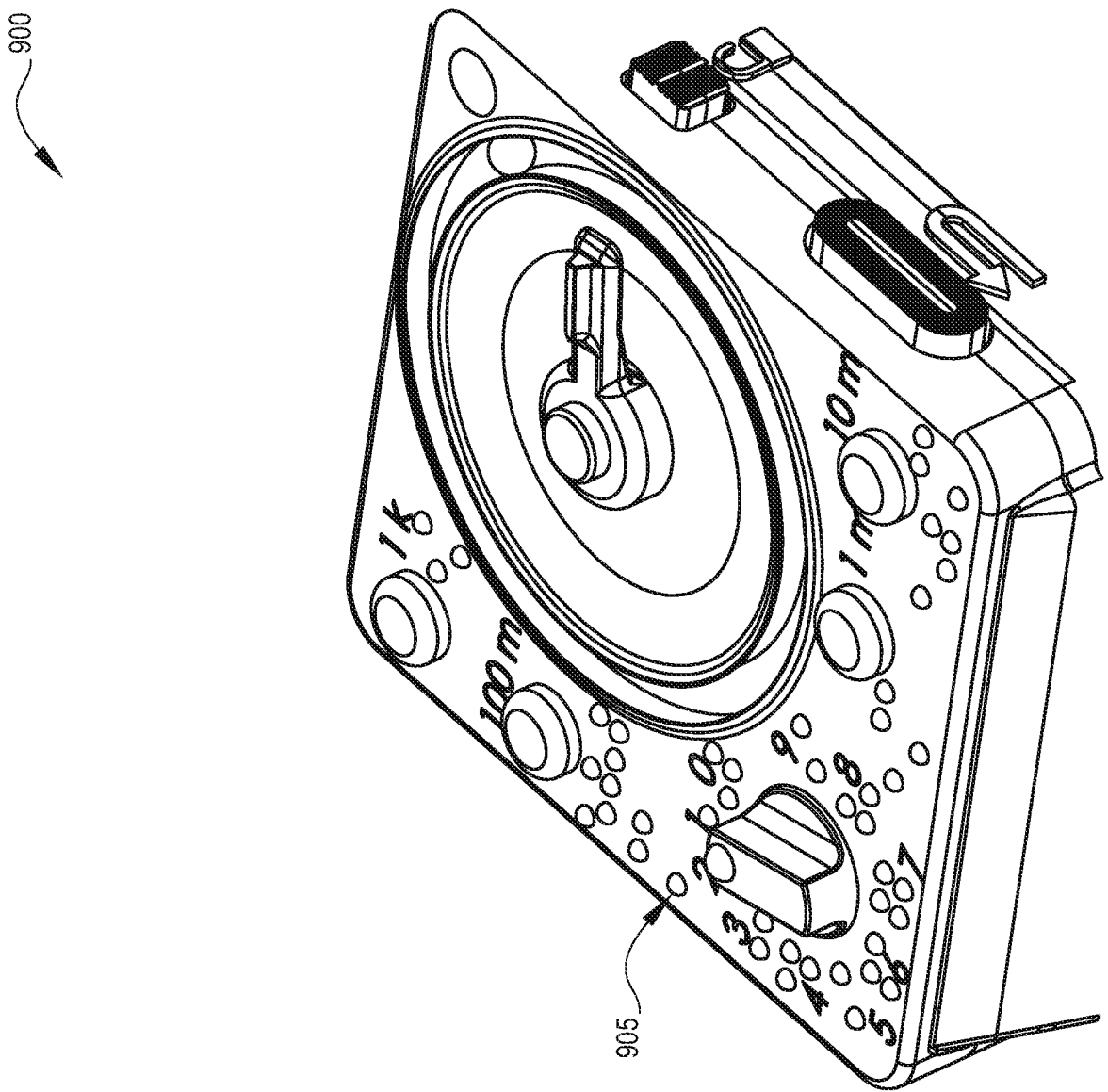
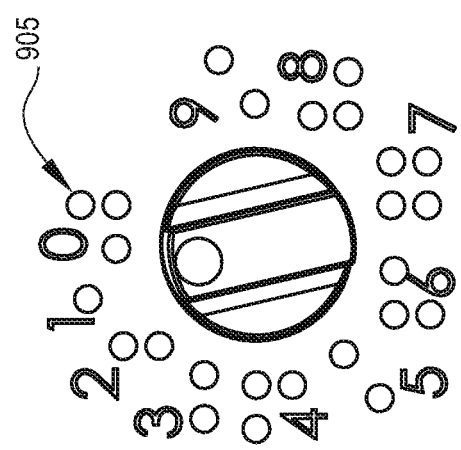
Fig. 9

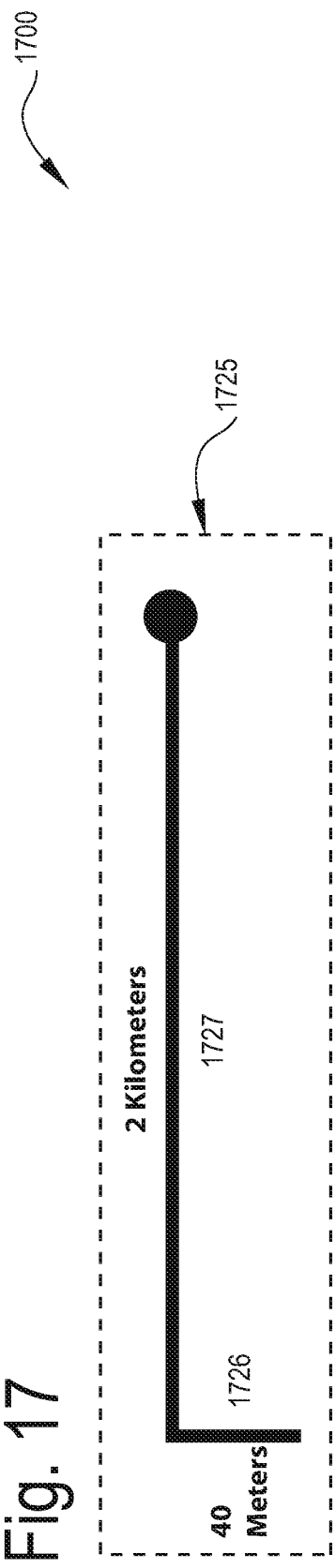
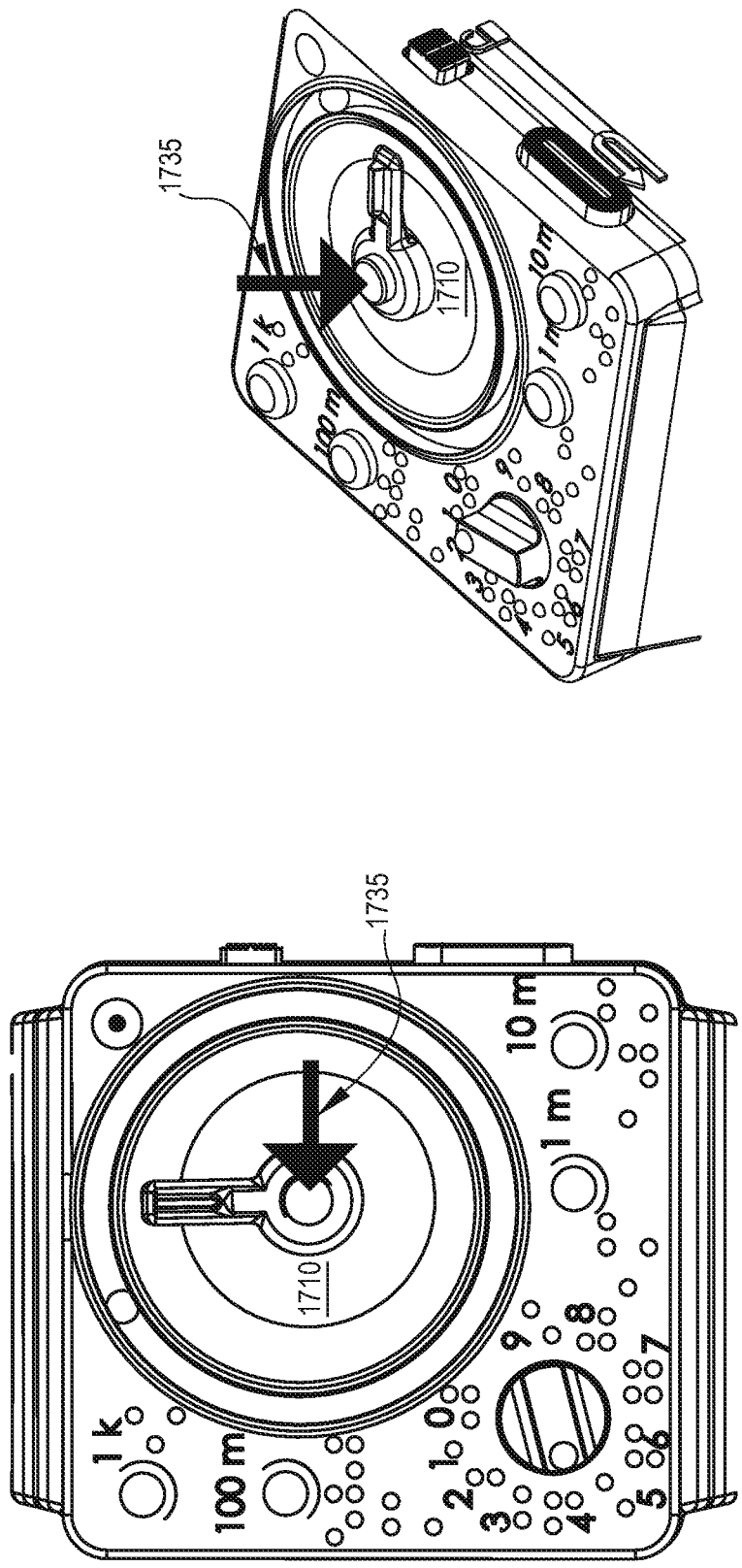
Fig. 17

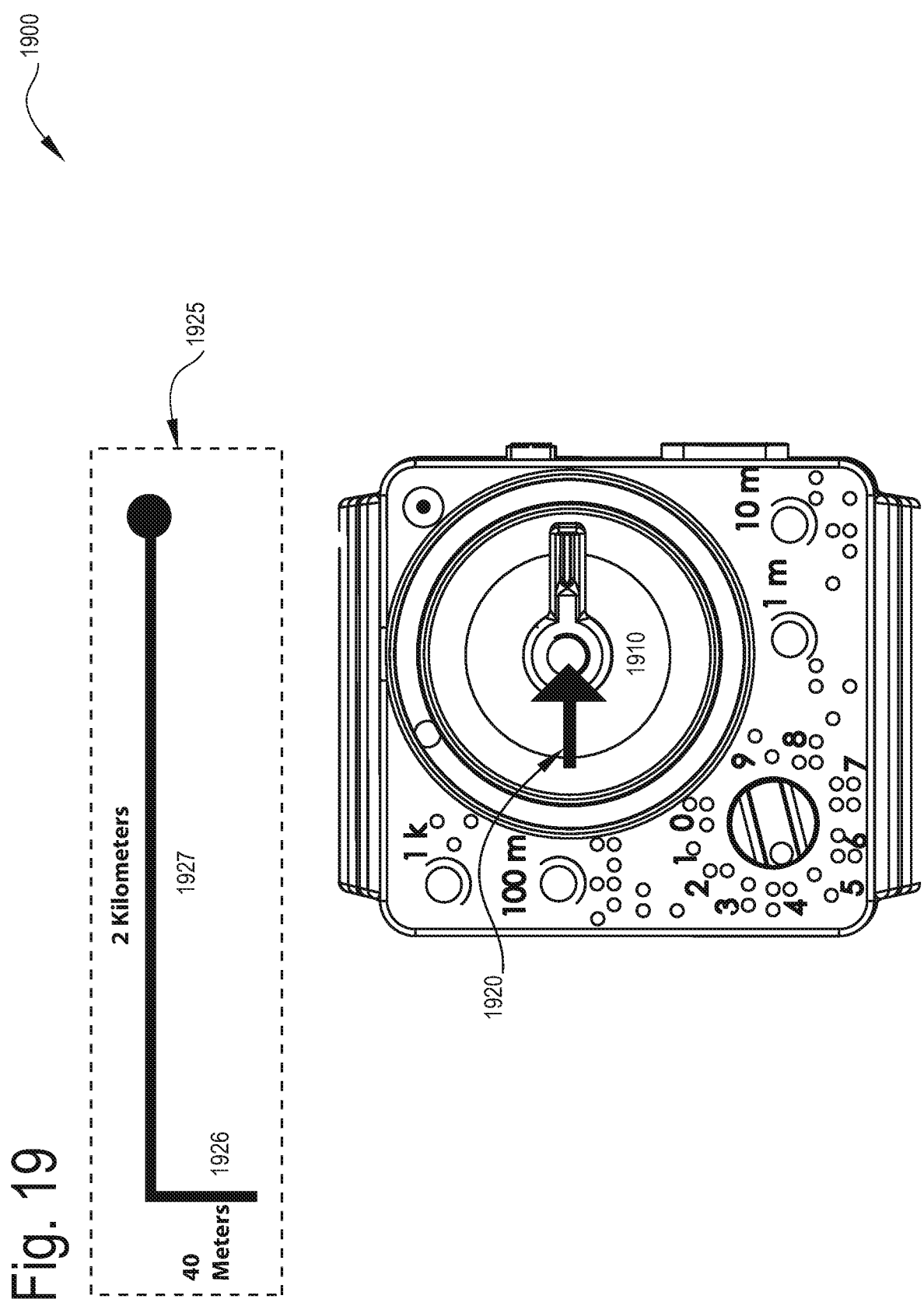

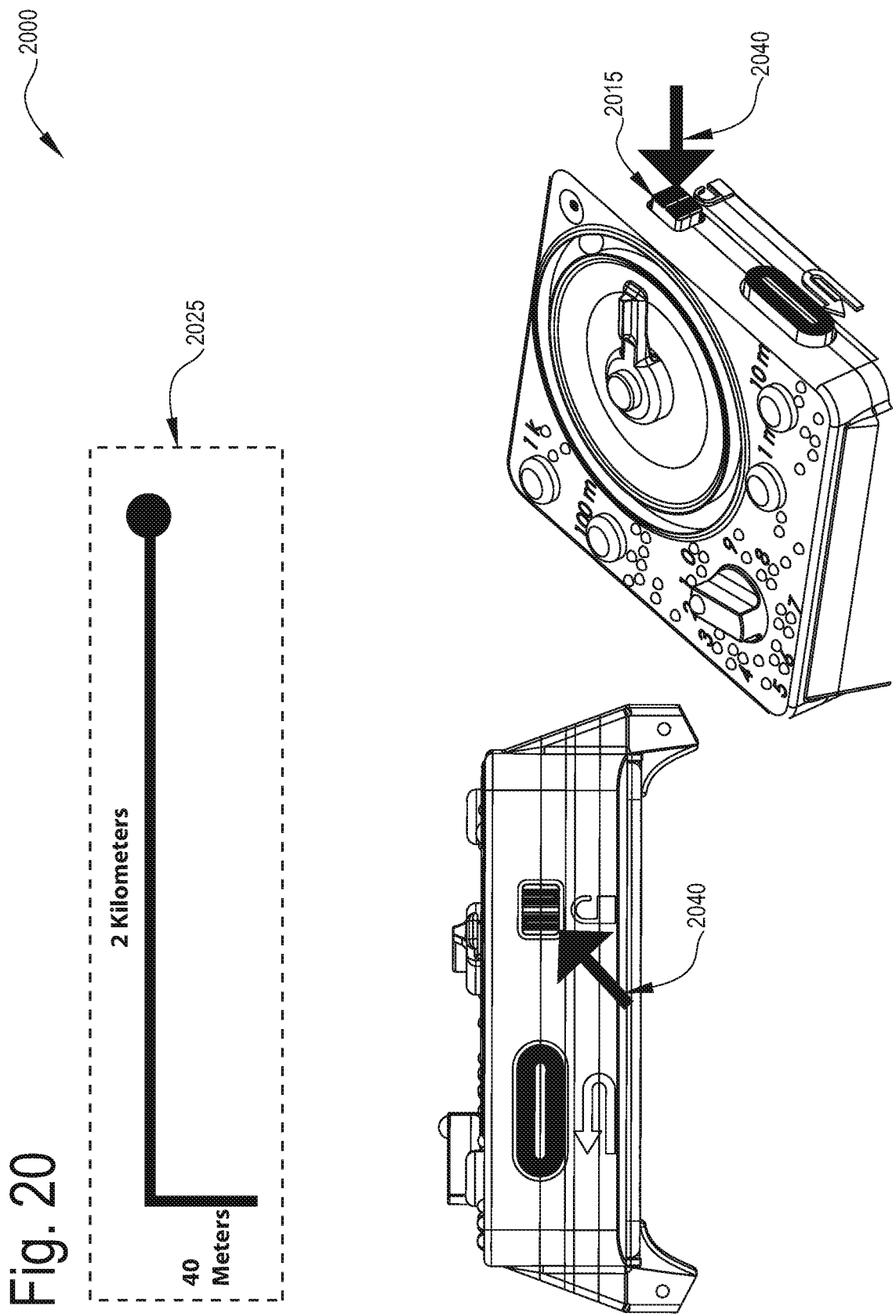

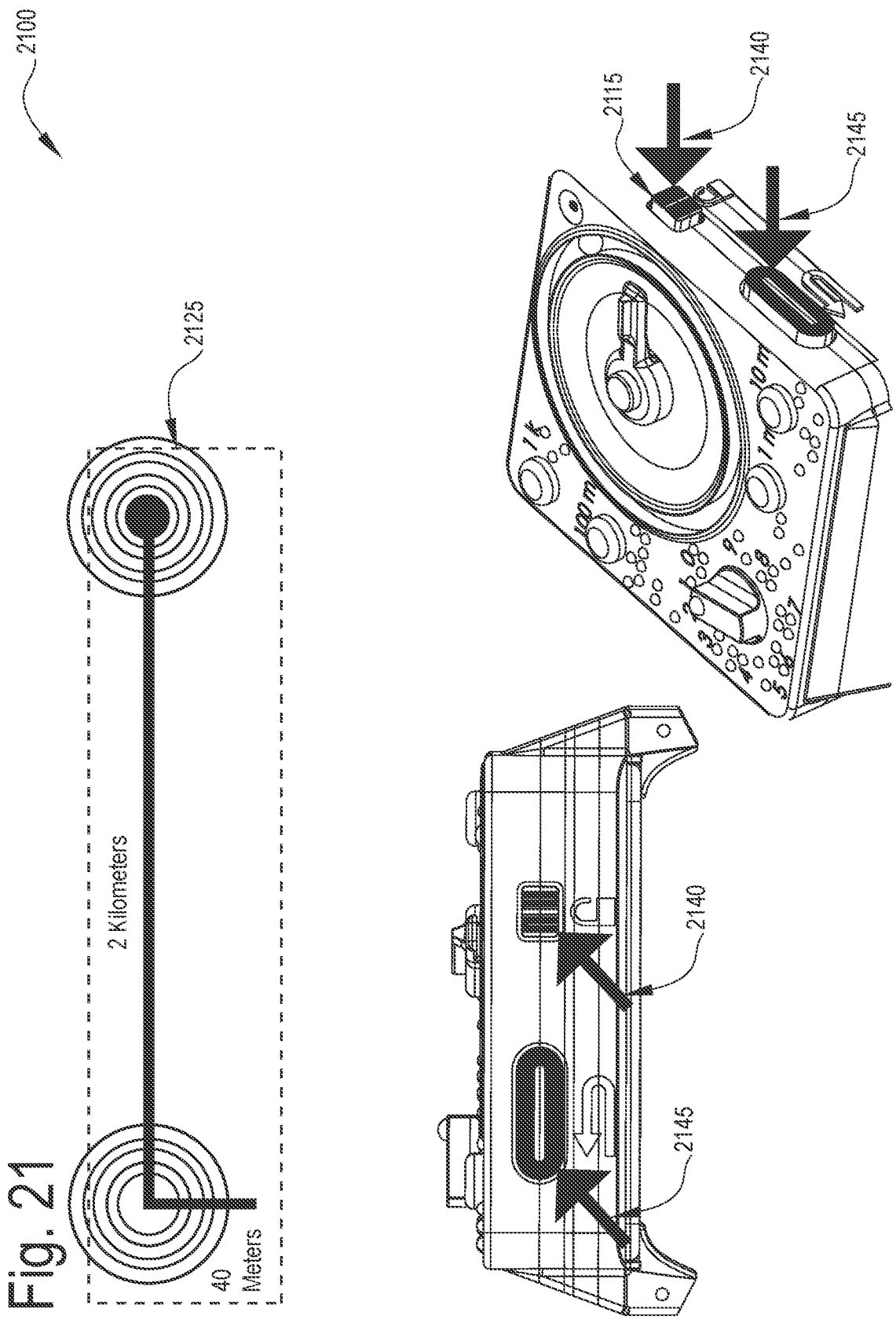

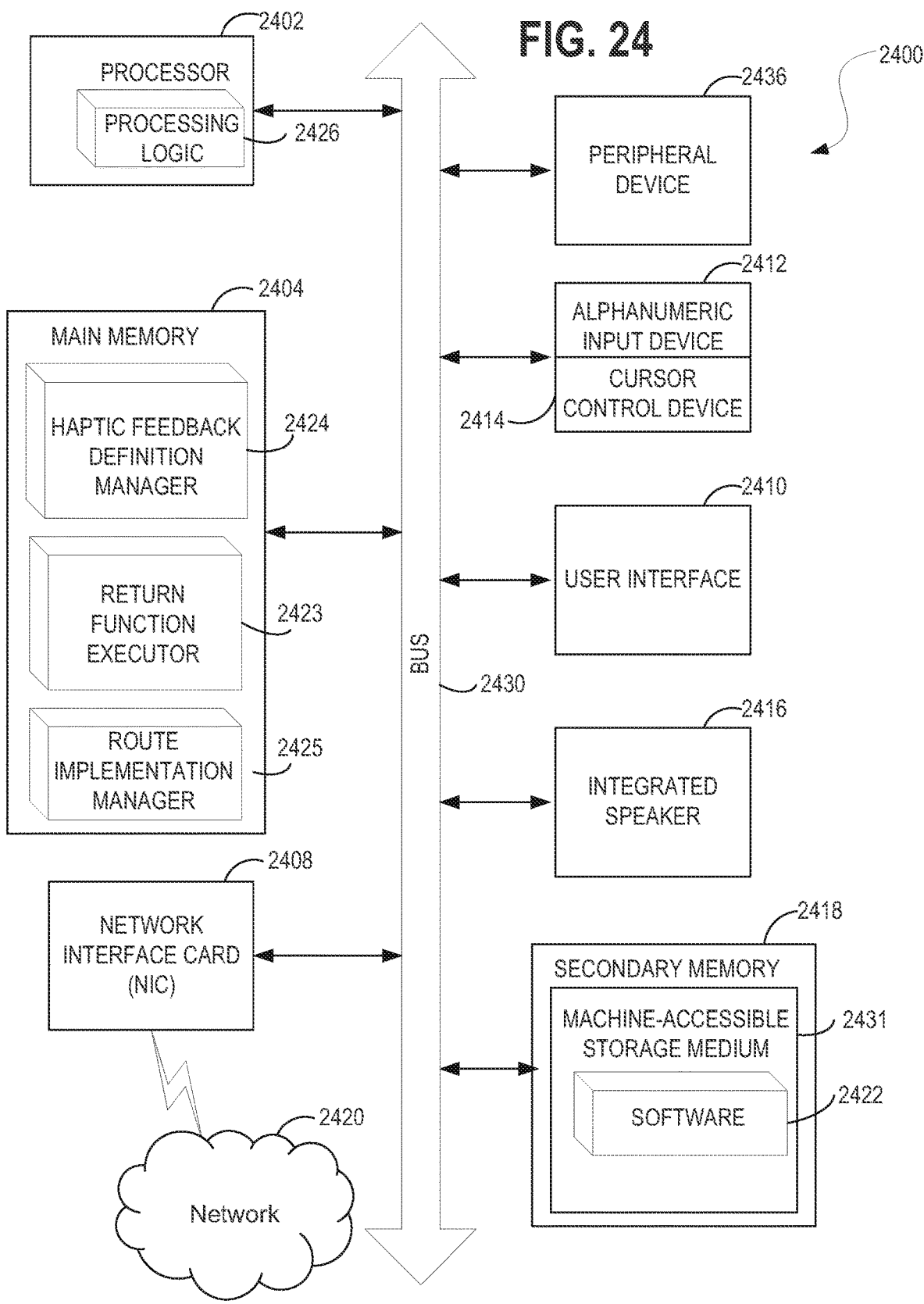

US 11,580,839 B2

SYSTEMS, METHODS, AND APPARATUSES FOR IMPLEMENTING A GPS DIRECTIONAL SWIMMING WATCH FOR THE EYESIGHT IMPAIRED

CLAIM OF PRIORITY

This U.S. Utility Patent Application is related to, and claims priority to, the U.S. Provisional Application No. 62/980,971 filed Feb. 24, 2020 entitled "SYSTEMS, METHODS, AND APPARATUSES FOR IMPLEMENTING A GPS DIRECTIONAL SWIMMING WATCH FOR THE EYESIGHT IMPAIRED,", the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of athletic gear, and more particularly, to systems, methods, and apparatuses for implementing a GPS directional swimming watch for the eyesight impaired.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Swimming is a sport that athletes and others of varying athletic skill can adapt to, and is less demanding on the muscles and joints than many other sports. However, swimmers who are blind or otherwise visually impaired face special challenges that can significantly limit their generally otherwise unrestricted ability to swim. Depending on the level of an athlete's visual acuity, adaptations are often necessary to compete in swimming. Conventionally, visually impaired athletes rely upon a "tapper," such as a person to tap on the athlete's shoulder with a tennis ball attached to a mobility cane to signal the visually impaired athlete to make a flip turn or change direction. One reason for using a tapper is that while visually impaired individuals may use a support cane or "white cane" with sensors to detect objects in their path above or below knee-level while walking, the use of such a cane while swimming is not practical as holding onto a cane while swimming obviously impairs an individual's swimming performance and ability.

Problematically, the conventional use of a "tapper" leaves the swimmer athlete dependent upon another person not only during competitions but also during practice and training sessions. Furthermore, a "tapper" is wholly infeasible for visually impaired swimmers attempting to swim or train in open waters, such as oceans, lakes, or large rivers, as there simply is nowhere for the tapper to stand within reach of the swimmer. Furthermore, having a tapper swim alongside a visually impaired swimmer, especially during competitions, is not practical.

The present state of the art may therefore benefit from the systems, methods, and apparatuses for implementing a GPS directional swimming watch for the eyesight impaired as is described herein.

BRIEF DESCRIPTION OF THE DRAWINGS

Embodiments of the present invention are illustrated by way of example, and not by way of limitation, and can be more fully understood with reference to the following detailed description when considered in connection with the figures in which:

FIG. 4 depicts exemplary anterior and posterior perspectives views of a GPS swim watch, in accordance with described embodiments.

FIG. 9 depicts an exemplary right-sided perspective view of a GPS swim watch with detail of Braille lettering, in accordance with described embodiments.

FIG. 17 further depicts an exemplary view of programming a first segment of a desired route into a GPS swim watch, in accordance with described embodiments.

FIG. 19 further depicts an exemplary view of programming a second segment of a desired route into a GPS swim watch, in accordance with described embodiments.

FIG. 20 further depicts an exemplary view of programming a second segment of a desired route into a GPS swim watch, in accordance with described embodiments.

FIG. 21 depicts an exemplary view of additional functions available for a programmed desired route into a GPS swim watch, in accordance with described embodiments.

FIG. 24 illustrates a diagrammatic representation of a machine 2400 in the exemplary form of a computer system within which a set of instructions may be executed.

DETAILED DESCRIPTION

Figure 1:
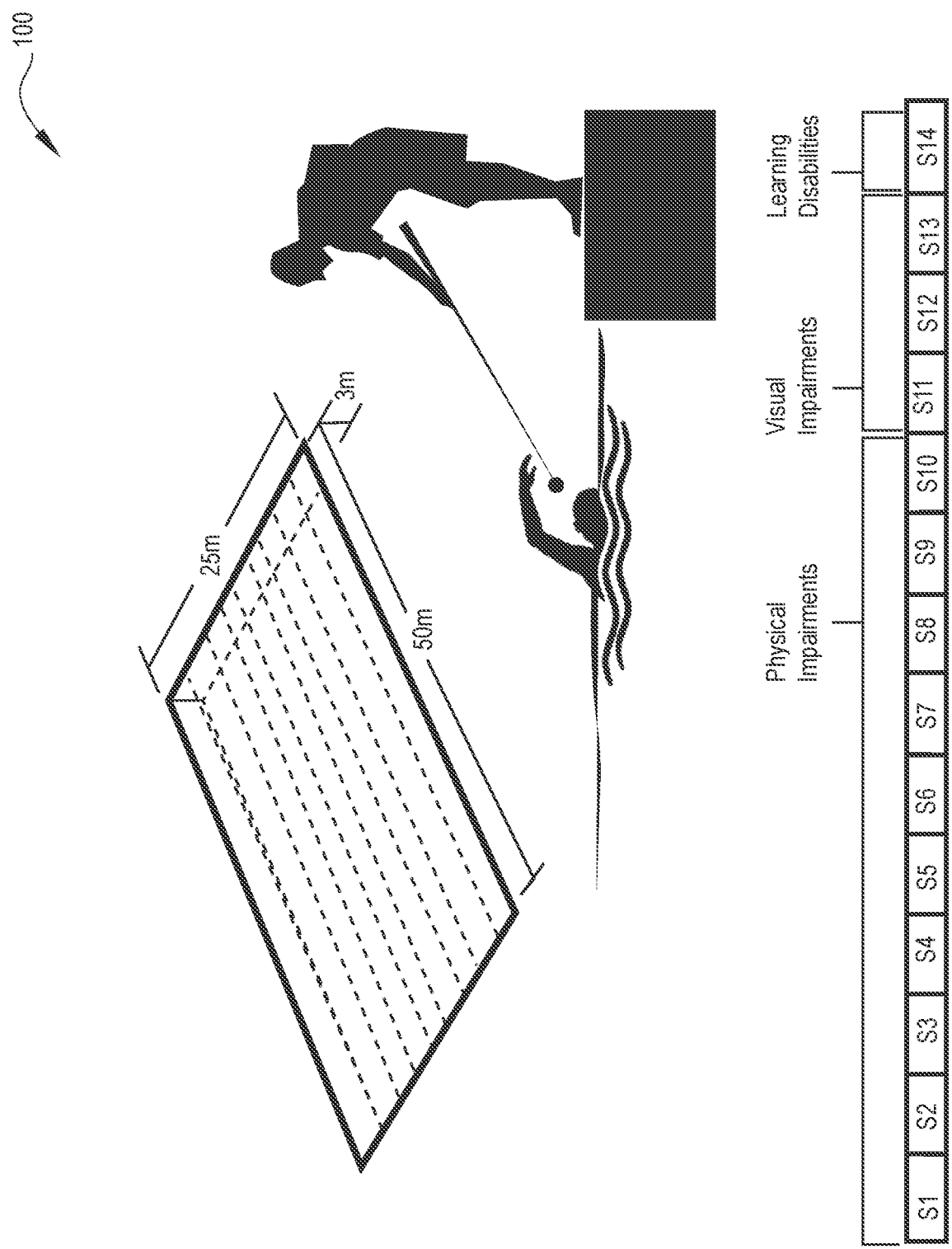
FIG. 1 depicts an exemplary visually impaired swimmer swimming in a pool with the assistance of a tapper, in accordance with described embodiments.

Described herein are systems, methods, and apparatuses for implementing a GPS directional swimming watch for the eyesight impaired, for example, to provide enable a blind or otherwise visually impaired athlete to train and swim in a pool or open water confidently without having to rely upon another person to establish and maintain the swimmer-athlete's direction.

There is a large group of physically impaired people throughout the world; some have visual impairments, hearing impairments, physical handicaps, and/or learning disabilities. These individuals have the right to live a productive life as non-impaired people do, including enjoying many of the same activities as non-impaired people where feasible. Such activities include exercise, working, utilizing public transportation, etc.

There are many inventions made to assist people with disabilities. However, new inventions to assist the visually impaired remain in need.

Swimming can be an excellent sport for individuals who are blind or visually impaired. Swimming is a sport open to individuals of all ages for competition, fitness, and fun. Swimming as a form of exercise can include water aerobics, lap swimming, and outdoor swimming. Visually impaired people do face some serious issues when they attempt swimming, such as challenges with navigation and direction. Whether swimming in a pool or open waters, visually impaired swimmers require assistance for a safe experience and to compete in water sports.

Described herein are training devices and training aids designed specifically for blind and/or visually impaired swimmers, the goal of which is to allow such athletes to swim with much more independence specifically in open waters without having to rely upon another person, such as a tapper.

For instance, according to a particular embodiment, there are systems, methods and apparatuses for implementing a GPS directional swim-watch including: a mechanical input to receive coordinates for a first location located at an end of a first fixed segment originating from an starting point in a first single cardinal direction; a mechanical input to receive coordinates for a second location located at the end of a second fixed segment originating from the first location in a second single cardinal direction perpendicular to the first cardinal direction, in which the first and second fixed segments form a selected route; a haptic feedback motor having a magnetized compass integrated therein to signal a wearer directional information relative to the first and second locations set, in which the hepatic feedback motor signals the wearer to change direction upon any of: (i) reaching the first location, (ii) reaching the second location, and (iii) deviating from any point along the selected route during bidirectional navigation; and a return function to signal to the wearer, via the haptic feedback motor, directional information relative to the starting point from any point along the selected course. Other related embodiments are described.

In the following description, numerous specific details are set forth such as examples of specific configurations, use cases, materials, components, etc., in order to provide a thorough understanding of the various embodiments. It will be apparent, however, to one skilled in the art that these specific details need not be employed to practice the embodiments disclosed herein. In other instances, well-known materials or methods have not been described in detail in order to avoid unnecessarily obscuring the disclosed embodiments.

In addition to various hardware components depicted in the figures and described herein, embodiments further include various operations described below. The operations described in accordance with such embodiments may be performed by specially manufactured components or may utilize general-purpose components in certain instances to realize and perform the innovative function and configuration of the described embodiments. Alternatively, the operations may be performed by a combination of customized specially manufactured components with certain general purpose components to make, use, and practice the inventive aspects as set forth herein.

FIG. 1 depicts an exemplary visually impaired swimmer swimming in a pool with the assistance of a tapper, in accordance with described embodiments.

Element 101 depicts an exemplary swimming pool used in professional sports such as the Paralympic Games, with dimensions measuring fifty (50) meters in length 104, twenty-five (25) meters in width 102, and three (3) meters in depth 103. According to certain embodiments, pool 101 may be divided into various lanes 105 via ropes or demarcating lanes with flotation devices including tapping stick 106. Some or all of the lanes 105 may be used.

Traditionally, a visually impaired swimmer 107 relies on a tapper 105 to alert them of barriers in their path and the ends of a pool, and when to turn or reverse direction. Tapper 105 may be positioned at the ends of a pool 101, at turns during races, or at other points in a swimming route. Tapper 105 uses a tapping pole 106 to touch visually impaired swimmer 107 to alert them of barriers or signal that it is time to turn or reverse swimming direction, by tapping swimmer 107 with the end of tapping pole 106. Tapping pole 106 may be made of plastic, aluminum, or other material and has a soft and rounded end 108, such as a tennis ball that will not hurt or irritate swimmer 107 when tapping pole 106 makes contact with swimmer 107, for example on the shoulder, back or head of swimmer 107. Tapper 105 must synchronize their tap with the momentum and swimming strokes of swimmer 107. This allows swimmer 107 to swim at top speed without fear of colliding with the edges of the pool or other barriers. Without a tapper 105, visually impaired swimmers 107 face burdensome constraints that limit their ability to practice turns or swim at faster speeds, as well as safety risks and the high likelihood of colliding into objects such as pool walls or other swimmers 107. These constraints obviously place visually impaired swimmer 107 at a competitive disadvantage during practice and competition and in harm's way while swimming.

Importantly, swimming in open waters often makes using tapper 105 impossible and visually impaired swimmers 107 may instead require swimming companions to assist with direction and safety. In fact, it is recommended that, for safety reasons, visually impaired swimmers 107 swimming in open waters always swim with a partner or group. This is especially true when there are no boundaries or markers to provide the visually impaired swimmer 107 with a line of direction, and therefore, a sighted swim partner is a must, according to conventional approaches. Again, this need for human assistance places visually impaired swimmer 107 at a disadvantage when compared to swimmers without visual impairments.

Further recommended is that in the case of an emergency, visually impaired swimmers 107 swimming in open waters should swim in the direction of waves which will eventually take them to shore, and that they should listen for sounds and signals directing them to land, such as voices, dogs barking, or music. Visually impaired swimmers 107 that are not entirely blind may find their way to land based on the outline or shapes of buildings, flags, lights, etc.

Visually impaired swimmer 107 competing in professional sports may also be allowed an aided start, for example by tapper 105 alerting them via tapping pole 106 to start swimming. Aided starts may also involve assistance from an individual such as tapper 105 to help visually impaired swimmer 107 sit or balance on a swimming podium.

A better and more inconspicuous solution is needed to improve independence and training opportunities for visually impaired swimmers 107 in various aquatic environments, while not singling out their disability status through colors or designs associated with the blind, all the while incorporating the benefits of high-tech devices.

Athletes with disabilities may be classified according to a range spanning from S1 to S14 on disability classification scale 111. Disability classification scale 111 categorizes how disability affects swimming ability. Disability classification scale 111 classifies physical impairments 108 ranging from S1 to S10, visual impairments 109 ranging from S11 to S12, and learning disabilities 110, falling under S14. According to certain embodiments, athletes with visual impairments 109 may wear blacked-out goggles to equalize their vision. Other conventional solutions for individual visually impaired swimmers 107 include separating pools into lanes with bright markers, recommending that visually impaired swimmers 107 slow down or count their strokes, and placing visual or auditory signals at the end of pool 101 to help with turns and orientation, such as audio from a radio or a bright beach towel for partially-sighted swimmers. However, while such conventional solutions improve the safety of an independent visually impaired swimmer 107, these techniques place visually impaired swimmers at a distinct disadvantage during recreation, practice and competition compared to other athletes who are not visually impaired, and these techniques are often not feasible in open waters.

Likewise, conventional solutions offered in the context of group water activities are also not sufficient for visually impaired swimmers 107. Accommodating visually impaired swimmers 107 during water aerobics, for example, may involve restricting a certain section of pool 101 and assigning a spot or zone within the restriction section of pool 101 to visually impaired swimmers 107. This may use up much of pool 101 and even when spread out, visually impaired swimmers 107 may have difficulty staying in their assigned spot and may collide or bump into other swimmers 107. Other conventional solutions such as linking visually impaired swimmers 107 for swim training or group exercise through flotation devices also pose similar space and safety problems.

Figure 2:
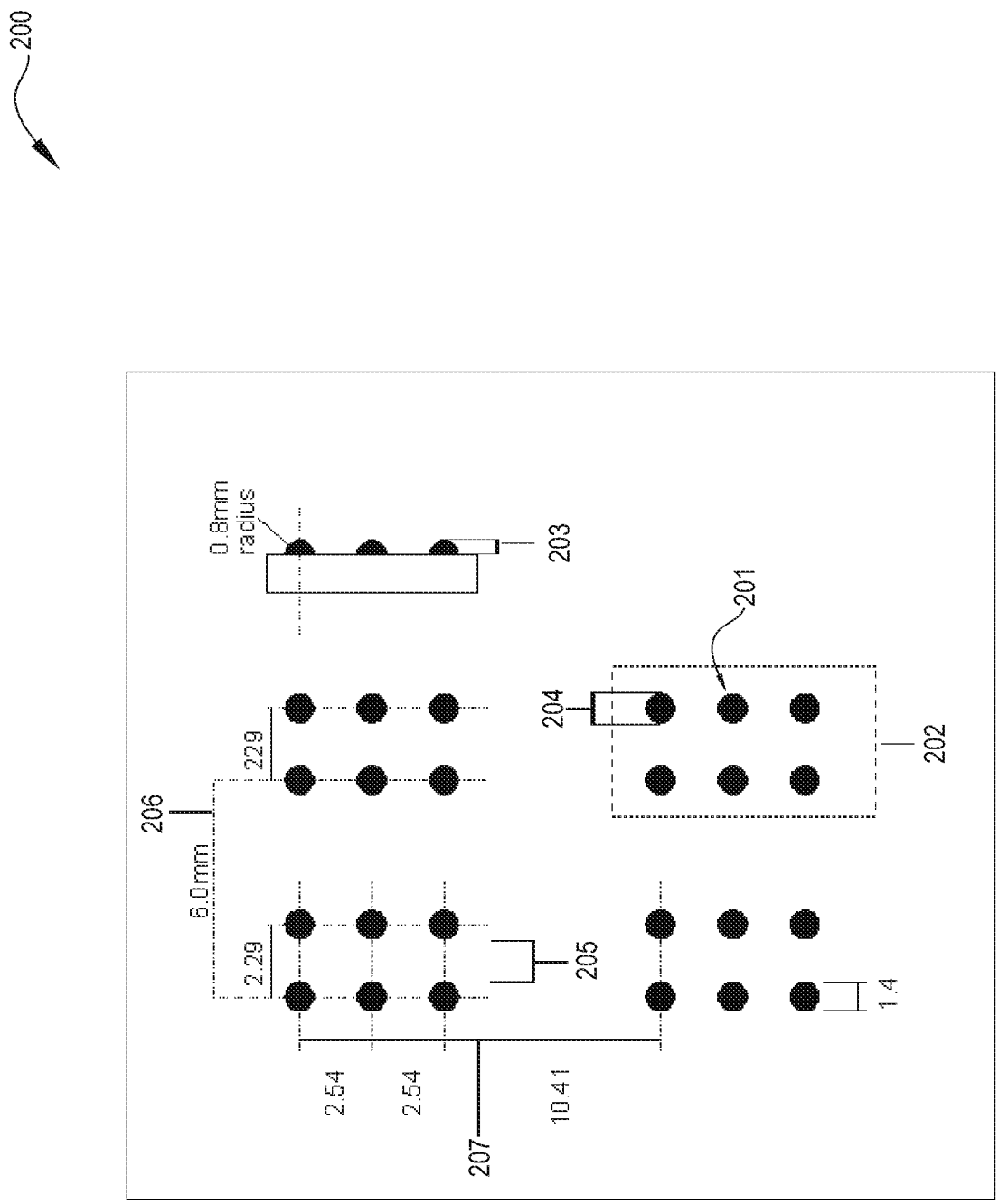
FIG. 2 depicts Braille size specifications utilized in accordance with described embodiments.

FIG. 2 depicts Braille size specifications utilized in accordance with described embodiments.

Braille is a tactile reading and writing system used by the visually impaired. Embossed dots 201 are evenly arranged in quadrangular letter spaces, cells 202. An entire cell 202 is permissibly is three dots high and two dots wide. Thus, each cell may contain up to six raised dots, with a maximum of 63 characters that may be formed, representing the letter and numbers in the English language. Braille is a fixed-width font meaning that every character occupies the same amount of space, independent of the number of dots in a cell.

For Braille to be read, the dots 201 of each cell must be easily discernible by touch and the height of dots 203 must be sufficient to be easily distinguished from the background.

In the United States and Canada, the Library of Congress has standard values used for Braille size according to their publication "Braille Books and Pamphlets—Specification 800", Section 3.2.1, published in February 2008, which states that the normal height 203 of Braille dots shall uniformly be 0.019 inches (0.48 mm).

The standards for creating Braille signage vary, with many states creating their own updated specifications based on the International Building Code instead of outdated requirements from the Americans with Disabilities Act (ADA) of 1990. Section 703 of the ADA sets ranges for Braille dimensions, including dot base diameter 204, distance between two dots in the same cell 205, distance between corresponding dots in adjacent cells 206, dot height 203 and distance between corresponding dots from one cell directly below 207. In general, the sizes of Braille used on signage are larger than Braille used in print materials.

Individual states have the right to determine their own laws on subjects not specifically mandated by the federal government and may also be more restrictive than existing federal mandates. State regulations must meet minimum standards of federal mandates and obtain approval from the Justice Department. Prior to the 2010 ADA Standards for Accessible Design, California was the first state to establish its own Braille standards, creating "California Braille" for building signage under the California Building Code in 1980. Codified as Section 1117b.5.6 of the California Code of Regulations, Title 24, the regulation requires that Contracted Grade 2 Braille be used, and that dots be domed or rounded to reduce the impacts of vandalism and to improve readability. California Braille also set dimension and spacing minimums for Braille dots.

The U.S. Access Board is the body responsible for developing guidelines to implement the ADA and published its first guidelines for Braille signage, "Americans with Disabilities Act Accessibility Guidelines (ADAAG)", in 1991. These guidelines closely followed guidelines from the Library of Congress for Braille embossed on paper. Updated guidelines were published by the U.S. Access Board in 2004, which changed the specifications for Braille sizing and spacing significantly and followed dimensions recommended from the American National Standards Institute's International Building Code, including the recommendation that dots 801 should be domed. The Department of Justice published the most recent standards for Braille signage in 2010, in a document entitled "2010 ADA Standards for Accessible Design" and adopted many of the 2004 ADAAG guidelines, with section 703.3 of the document outlining Braille dimensions, position, and other parameters for signage.

TABLE 1

Braille Signage Dimensions (excerpt from 2010 ADA Standards for Accessible Design Table 703.3.1):

| Measurement Range | Minimum Inches (mm) to Maximum Inches (mm) |
|---|---|
| Dot base diameter | 0.059 (1.5 mm) to 0.063 (1.6 mm) |
| Distance between two dots in the same cell | 0.090 (2.3 mm) to 0.100 (2.5 mm) |
| Distance between corresponding dots in adjacent cells (measured center to center) | 0.241 (6.1 mm) to 0.300 (7.6 mm) |
| Dot height | 0.025 (0.6 mm) to 0.037 (0.9 mm) |
| Distance between corresponding dots from one cell directly below (measured center to center) | 0.395 (10 mm) to 0.400 (10.2 mm) |

Table 1 describes the most current guidelines for Braille signage dimensions. The current guidelines require that Braille signage have a dot base diameter 204 of 0.059 to 0.063 inches, distance between two dots in the same cell 205 of 0.090 to 0.100 inches, distance between corresponding dots in adjacent cells (measured center to center) 206 of 0.241 to 0.300 inches, dot height 203 of 0.025 to 0.037 inches, and distance between corresponding dots from one cell directly below (measured center to center) 207 of 0.395 to 0.400 inches.

As will be further discussed, GPS swim watch 200 is a device that visually impaired swimmers may wear on their wrist while swimming to obtain assistance with navigation and maneuvering.

Figure 3:
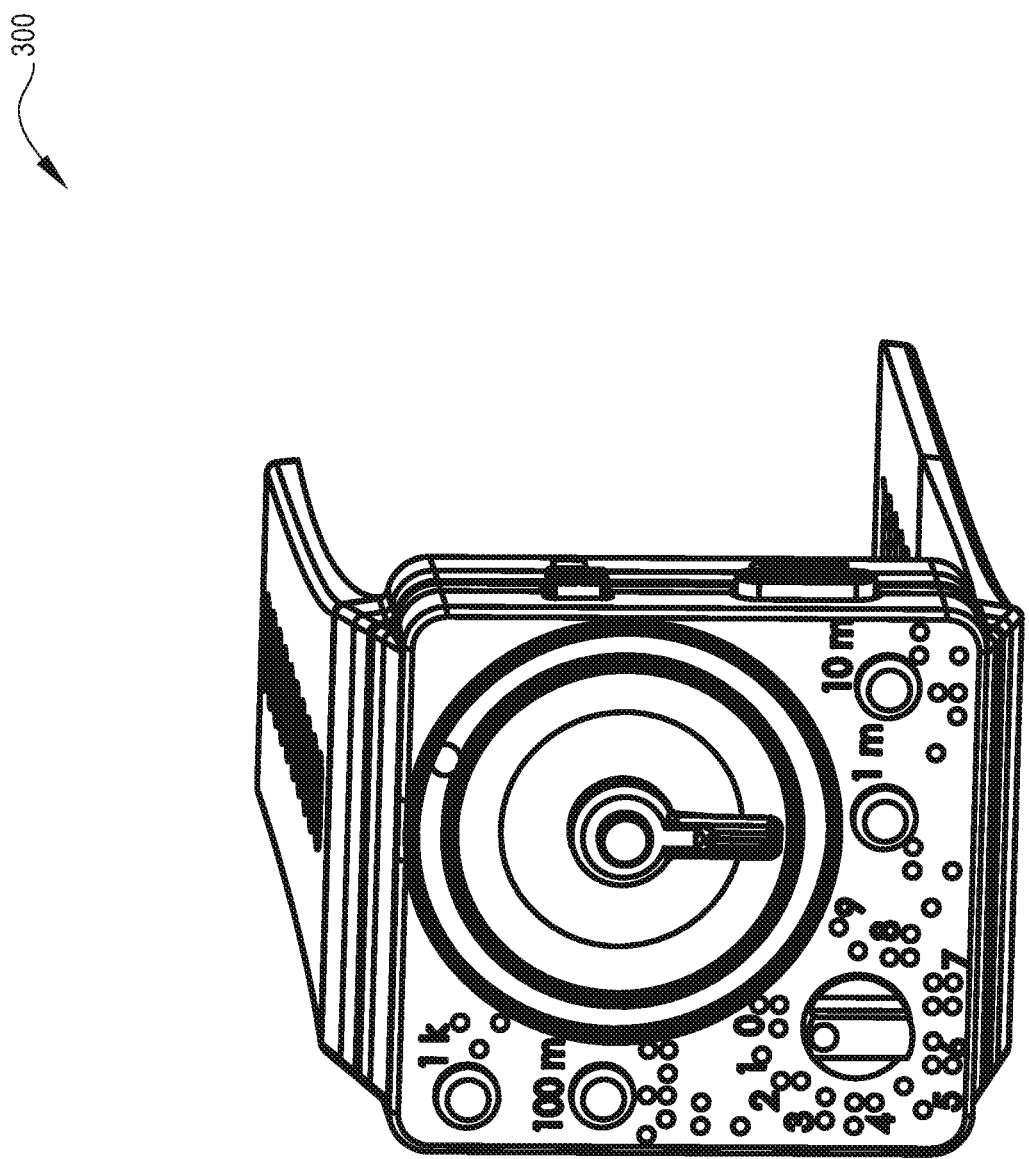
FIG. 3 depicts an exemplary anterior perspective view of a GPS swim watch, in accordance with described embodiments.

FIG. 3 depicts an exemplary anterior perspective view of a GPS swim watch, in accordance with described embodiments.

FIG. 4 depicts exemplary anterior and posterior perspectives views of a GPS swim watch, in accordance with described embodiments.

Mount (anterior perspective view) 405 and mount (posterior perspective view) 410 depict mounts at the top and bottom ends of GPS swim watch 400 to which a wristband or other support may be attached to.

Figure 5:
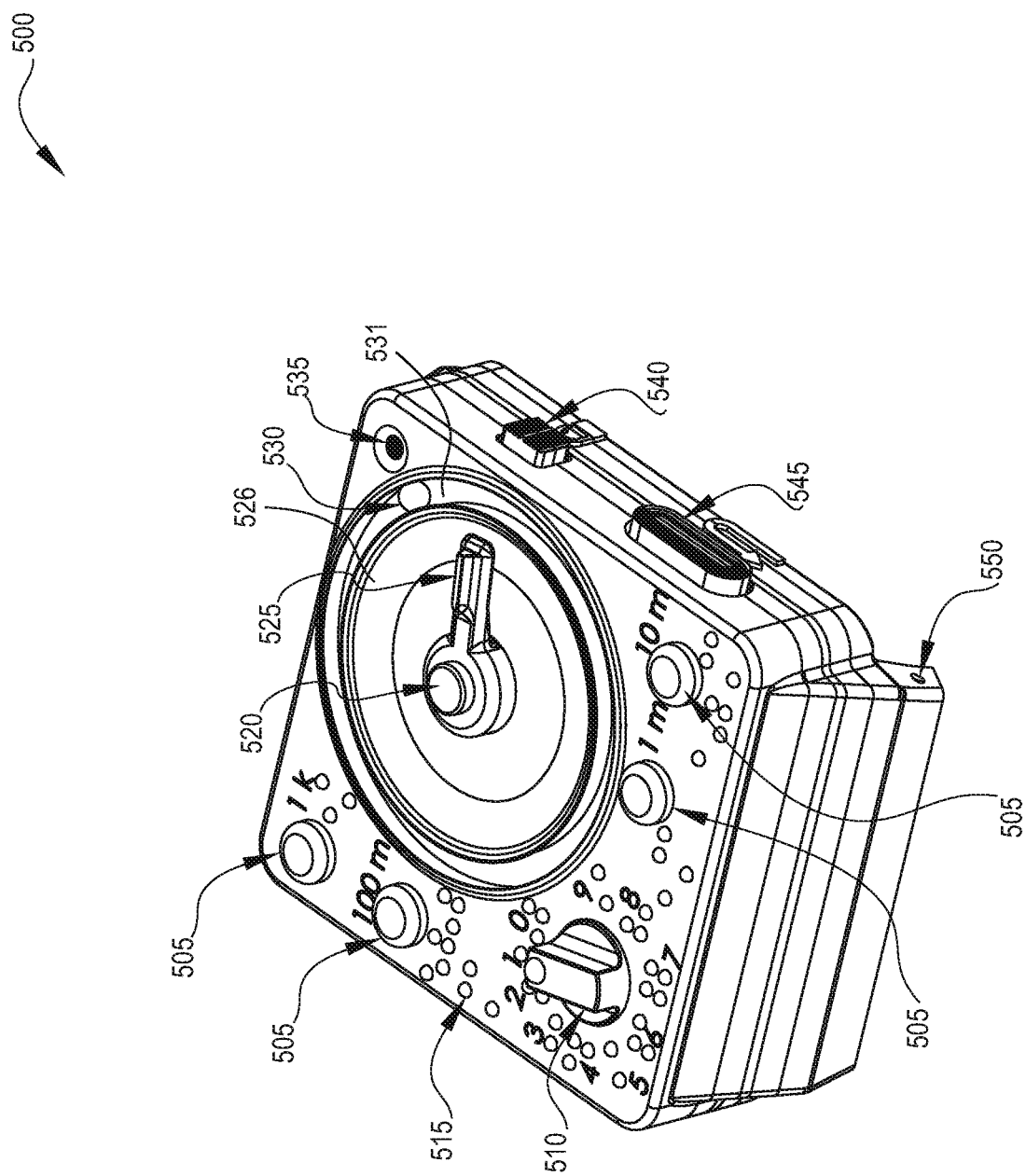
FIG. 5 depicts an exemplary superior perspective view of a GPS swim watch, in accordance with described embodiments.

FIG. 5 depicts an exemplary superior perspective view of a GPS swim watch, in accordance with described embodiments.

Distance value knob 510 allows for setting of the first digit of various distance segments in a desired swimming or other exercise route. Distance value buttons 505 are located along the bottom and left sides of GPS swim watch 400 and allow for the setting of the second and subsequent digits or units of the various distance segments. According to certain embodiments, distance value buttons 5050 are available as 1 m, 10 m, 100 m, and 1 Km. The setting of various locations, segments, and directions in a desired route will be further discussed in FIGS. 14-21.

Direction arm 525 may be manually manipulated in a circular fashion along circle 536 which represents a compass rose, to allow for the setting of cardinal (north, south, east, west), intermediate (NE, SE, SW, NW), or other directions for each segment of a desired route.

According to certain embodiments, iterations of pressing enter button 520 may allow for the setting of first and subsequent locations and segments in a route, by allowing for the registering and toggling of directions set by the first and subsequent manipulations of direction arm 525, as well as distance values set by distance value buttons 505 and distance value knob 510. Each time enter button 520 is pressed, a new segment of a desired route is programmed. The setting of various locations, segments, and directions in a desired route will be further discussed in FIGS. 14-21.

Directional sphere 530 sits within circular trench 531 of GPS swim watch 500 and indicates the direction of the magnetic north pole ("magnetic north"), based on an internal magnetized compass housed within the chassis of GPS swim watch 500. According to certain embodiments, should directional sphere 530 move out of position due to movement or collision of GPS swim watch 500 with other objects or water, a simple shake of GPS swim watch 500 will allow directional sphere 530 to return to its default position indicating magnetic north.

Braille inscriptions 515 spread across the face of the GPS swim watch identify the various controls and components of the GPS swim watch in the Braille language. According to certain embodiments, braille inscriptions 515 may prescribe to federal, state or other regulations for Braille signage as previously discussed, including size, spacing, height, and shape.

Indicator light 535 may provide visual cues independent of, or in combination with, haptic feedback and audio cues. According to certain embodiments, indicator light 535 may signify a low power source, a need for directional change to stay on-route, or that a course correction is needed because the wearer is headed in a wrong direction. According to certain embodiments indicator light 535 may blink, pulse, turn on or off, change colors, change intensity, emit a spotlight, emit a hologram with text, graphics, video, etc.

Lock button 540 allows a user to lock desired route settings such as direction and distance so that accidentally activating components of swim watch 500 such as knob 510, buttons 505, or direction arm 525, for example during physical activity, does not upset the settings. Pressing lock button 540 may toggle between locking and unlocking the aforementioned settings.

Return button 545 may be activated at any time during a programmed route when a wearer of GPS swim watch 500 desires to return along their route, all the way back to the previously configured starting point for the route.

Pin 550 allows for detaching GPS swim watch 500 from a wristband or other accessory.

Figure 6:
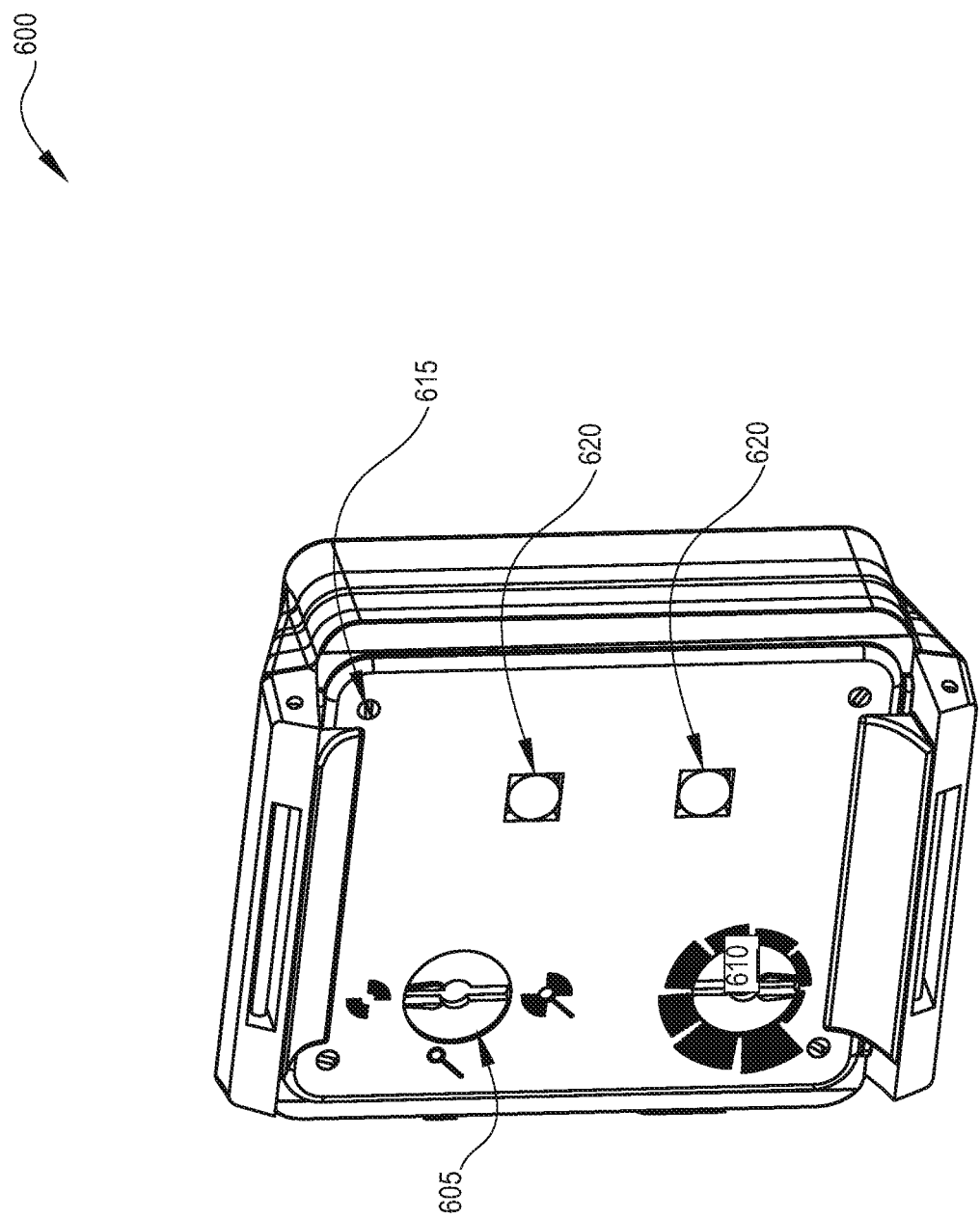
FIG. 6 depicts an exemplary posterior perspective view of a GPS swim watch, in accordance with described embodiments.

FIG. 6 depicts an exemplary posterior perspective view of a GPS swim watch, in accordance with described embodiments.

Depicted here are alarm mode knob 605 for setting alert types, intermittent pulse knob 610 to provide haptic feedback and auditory cues, charger ports for dual-prong style clip 620, and screw and screw hole 615 for opening and securing GPS swim watch 600.

Haptic feedback is the use of touch to communicate with users. Most people are familiar with the vibration in a mobile phone or the rumble in a game controller, which are relatively simple examples of haptic feedback. Haptic feedback (often shortened to just haptics) stimulating the sense of touch and thus does not rely on the visual acuity of the user of a device.

Not only can the wearer of the GPS swim watch, such as a visually impaired athlete, touch the swim watch to discern navigational information, but the swim watch can touch the wearer back to communicate various information and metrics, such as navigational course corrections.

Haptic feedback may be implemented via a haptic feedback vibrational motor integrated into the GPS swim watch, which may include a feed terminal and brush housed within a brush holder, to receive a communicator coupled to a permanent magnet, which may interface with a spacer and a weight.

Figure 7:
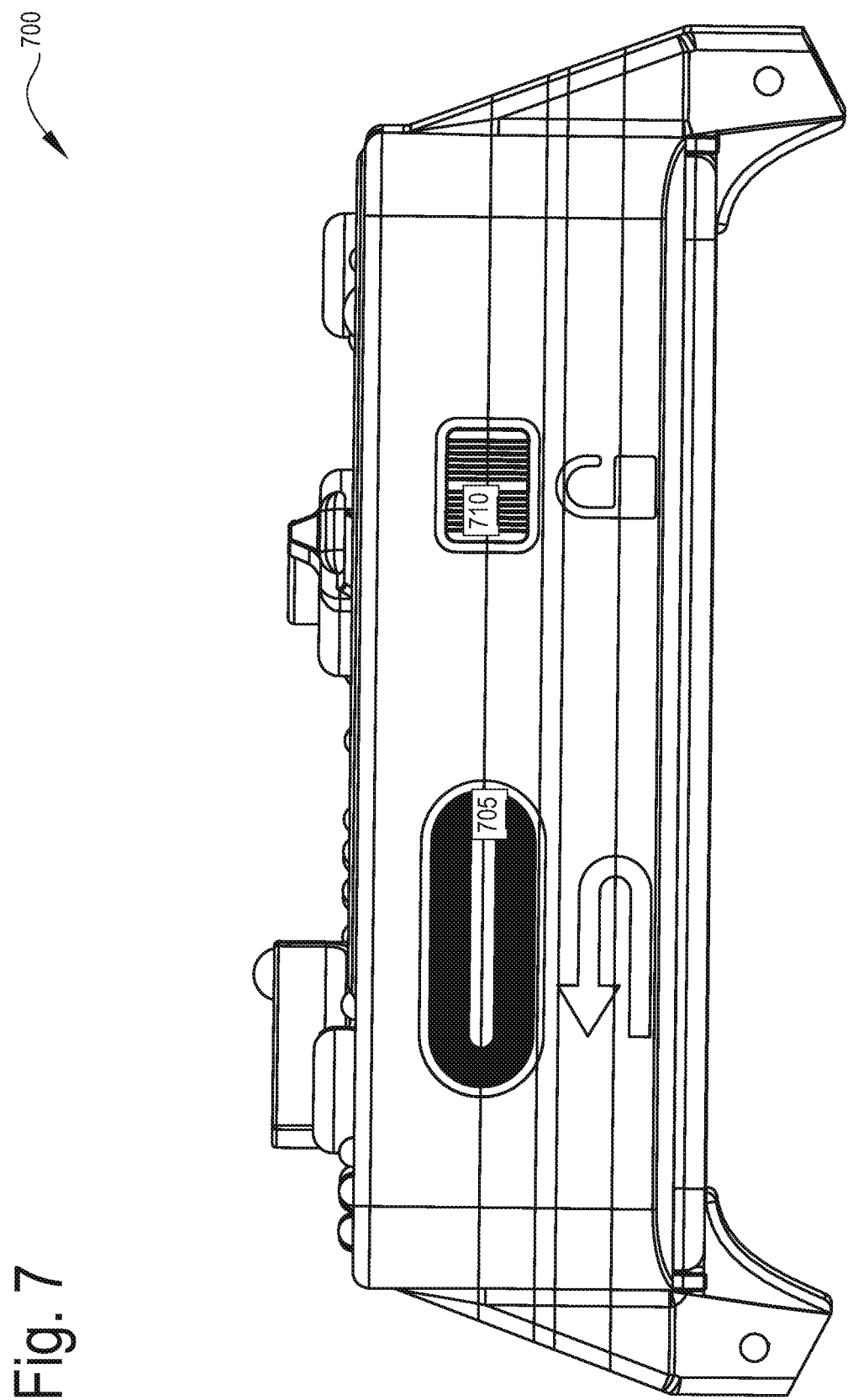
FIG. 7 depicts an exemplary right-side view of a GPS swim watch in a supine position, in accordance with described embodiments.

FIG. 7 depicts an exemplary right-side view of a GPS swim watch in a supine position, in accordance with described embodiments.

Again shown are return button 705 and lock button 710. According to certain embodiments, pressing one or more or return button 705 and lock button 710 may trigger specific auditory or haptic feedback signals including beeping, vibrating, pulsing etc. to indicate return function status and lock/unlock status of pre-configured direction and distance.

Figure 8:
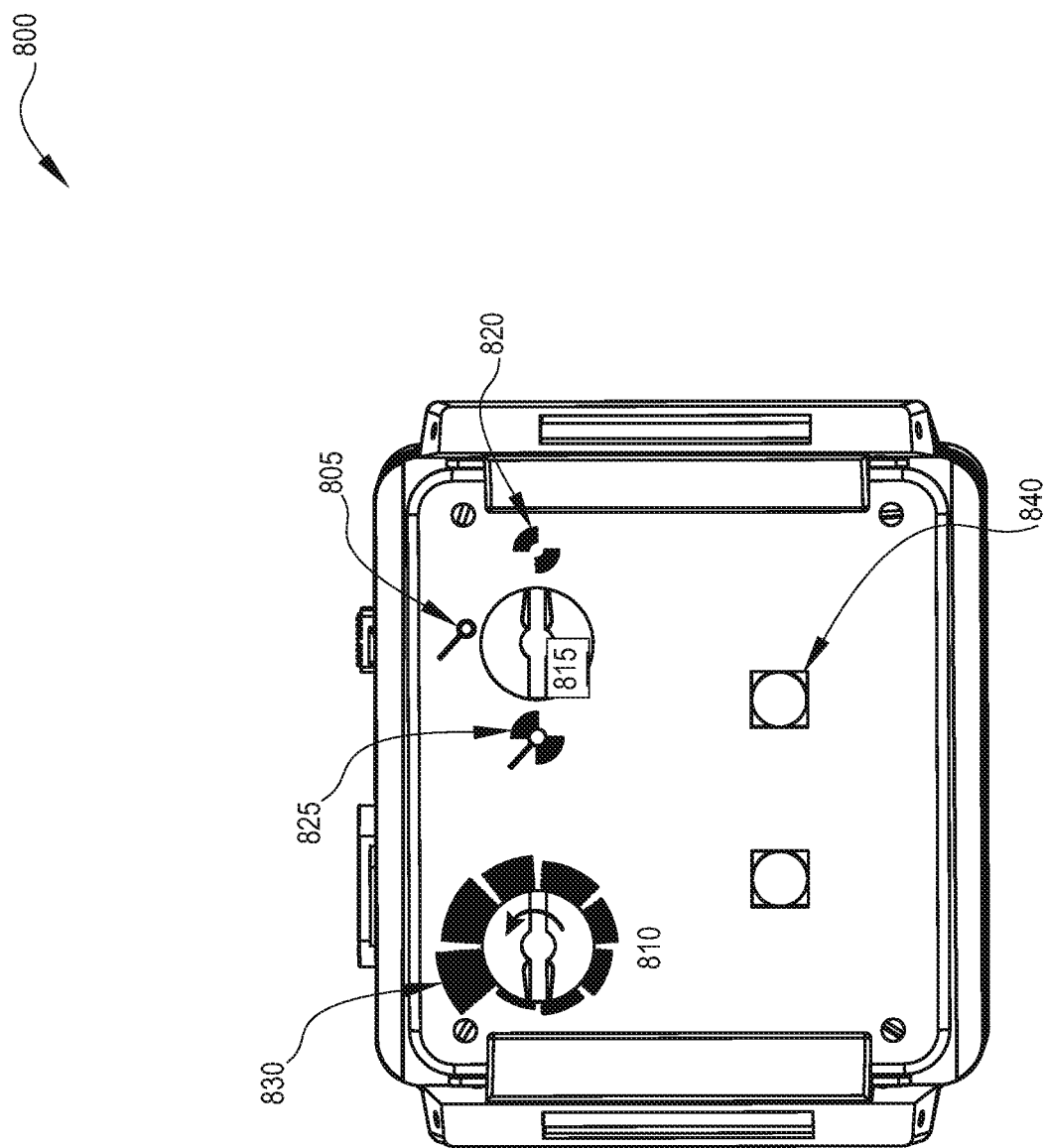
FIG. 8 depicts an exemplary inferior perspective view of a GPS swim watch, in accordance with described embodiments.

FIG. 8 depicts an exemplary inferior perspective view of a GPS swim watch, in accordance with described embodiments.

Mode nub 815 includes settings for configurable alert types such as beep and tap 825, tap or vibration 805, and beep 820.

Intermittent pulsing nub 810 provides haptic feedback and/or auditory cues by vibrating, pulsing, and/or beeping on the wearer's wrist in a certain orientation corresponding to the correct direction of travel. According to certain embodiments, intermittent pulsing nub 810 may vibrate, pulse or beep with varying intensity. According to yet other embodiments, intermittent pulsing nub 810 may be activated pursuant to the wearer straying off-course, or when a directional change is needed, for example when transitioning between segments of a programmed route or when return button 705 is activated. Such alerts allow wearers, and especially visually impaired wearers, to stay on course and perform with improved speed and control while swimming. Again shown are charger ports for dual-prong style clip 840 which allow for connections to charge GPS swim watch 800.

FIG. 9 depicts an exemplary right-sided perspective view of a GPS swim watch with detail of Braille lettering, in accordance with described embodiments.

Braille lettering 905 may be associated with inscriptions on the face or other parts of GPS swim watch 900. According to certain embodiments, the numbered inscriptions around distance value knob 510 may have corresponding Braille lettering.

Figure 10:
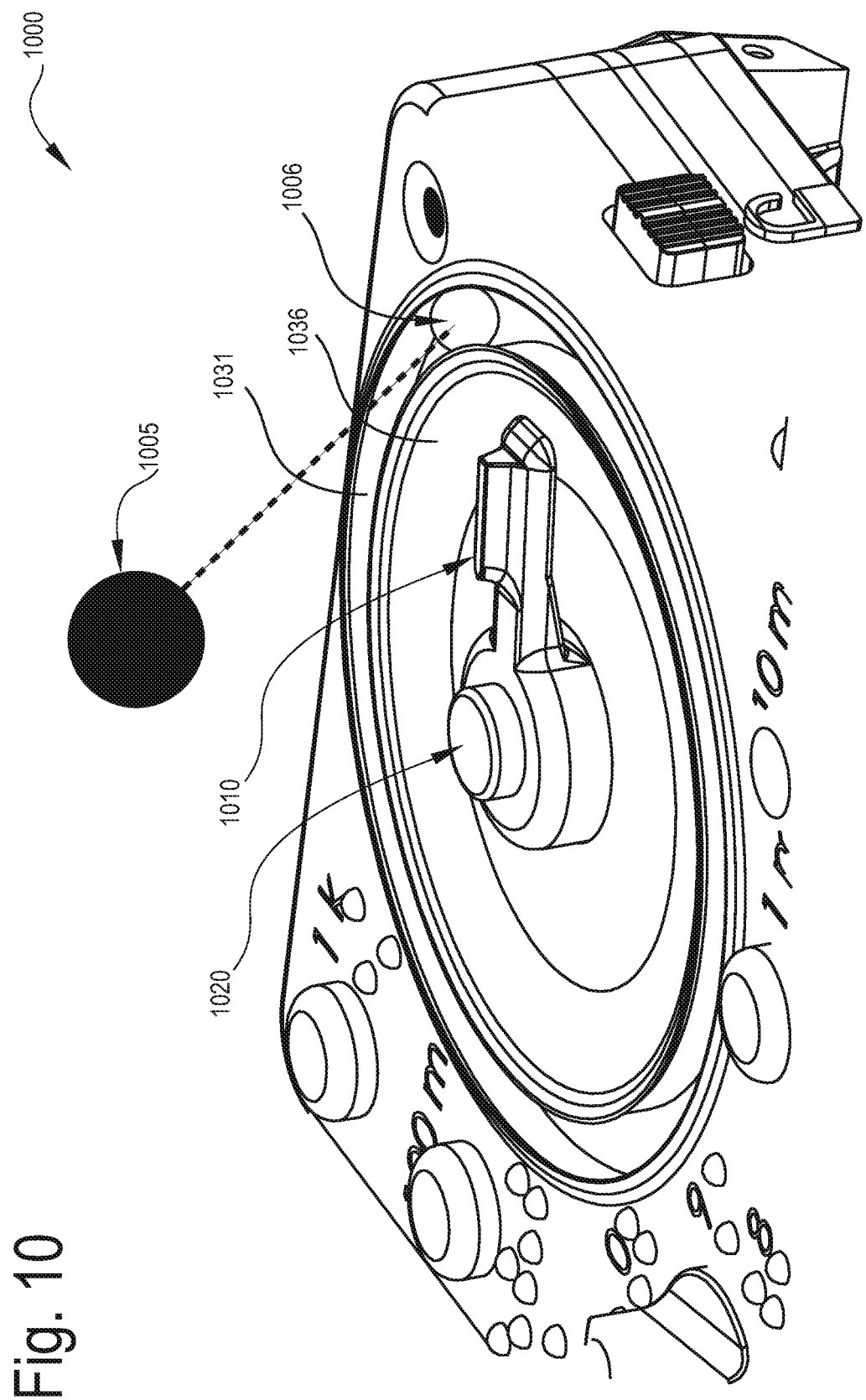
FIG. 10 depicts an exemplary right-sided perspective view of a GPS swim watch with detail of directional components, in accordance with described embodiments.

FIG. 10 depicts an exemplary right-sided perspective view of a GPS swim watch with detail of directional components, in accordance with described embodiments.

Direction arm 1010 may be manually manipulated in a circular fashion along circle 1036 which represents a compass rose, to allow for the setting of cardinal (north, south, east, west), intermediate (NE, SE, SW, NW), or other directions for each segment of a desired route.

According to certain embodiments, iterations of pressing enter button 1020 may allow for the setting of first and subsequent locations and segments in a route, by allowing for the registering and toggling of directions set by the first and subsequent manipulations of direction arm 1010, as well as distance values set by distance value buttons 505 and distance value knob 510. Each time enter button 1020 is pressed, a new segment of a desired route is programmed. The setting of various locations, segments, and directions in a desired route will be further discussed in FIGS. 14-21.

Directional sphere 205 rests on magnetic north position 1006 of circular trench 1031 of GPS swim watch 1000 and indicates the direction of the magnetic north pole ("magnetic north"), based on an internal magnetized compass housed within the chassis of GPS swim watch 1000. According to certain embodiments, should directional sphere 1005 move out of position due to movement or collision of GPS swim watch 1000 with other objects or water, a simple shake of GPS swim watch 1000 will allow directional sphere 1005 to return to its default position 1006.

Figure 11:
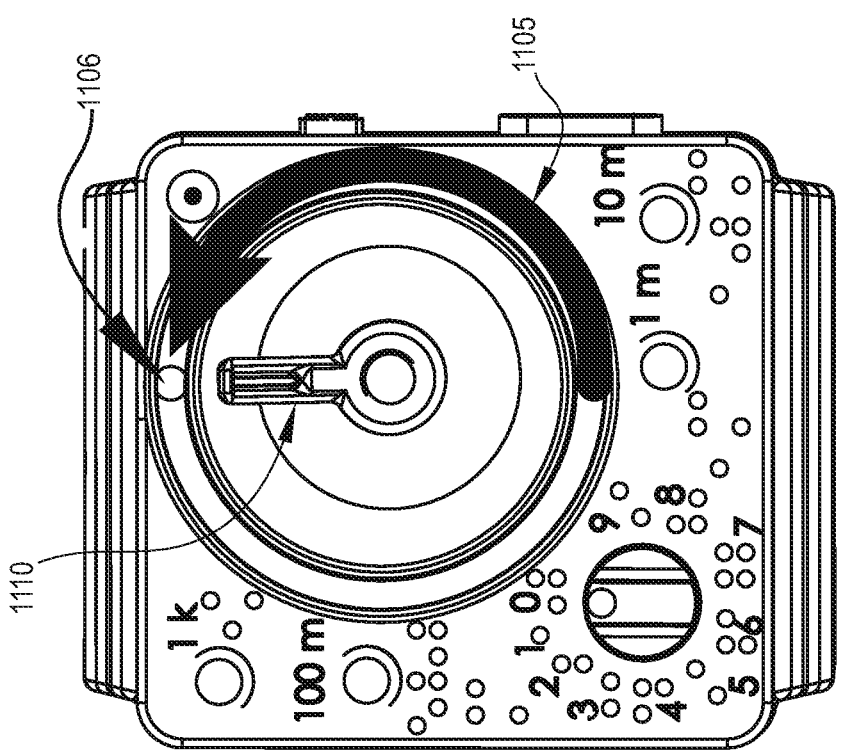
FIG. 11 depicts an exemplary view of a GPS swim watch with detail of setting the direction arm, in accordance with described embodiments.

FIG. 11 depicts an exemplary view of a GPS swim watch with detail of setting the direction arm, in accordance with described embodiments.

As depicted here, direction arm 1110 is integrated with magnetized internal compass housed in the chassis of GPS swim watch 1100. Direction arm 1110 has been adjusted 1105 to point in magnetic north position 1106, thus setting the current route segment orientation in the cardinal north direction.

Figure 12:
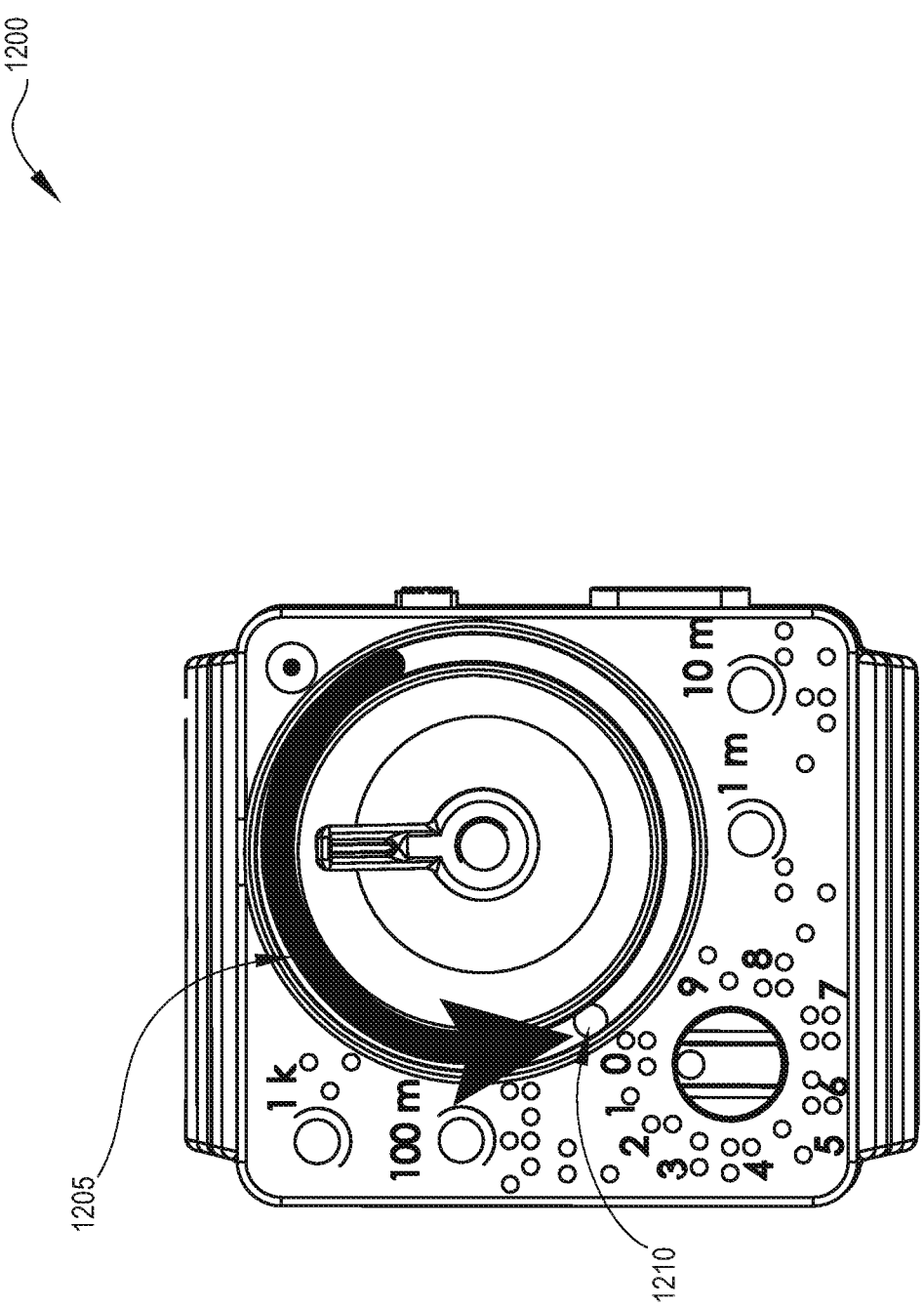
FIG. 12 depicts an exemplary view of a GPS swim watch with detail of a displaced directional sphere, in accordance with described embodiments.

FIG. 12 depicts an exemplary view of a GPS swim watch with detail of a displaced directional sphere, in accordance with described embodiments.

As depicted here, directional sphere 1210 has been displaced from its default positon 1006 which points towards magnetic north. The magnetized compass housed within the chassis of GPS swim watch 1200 serves as a failsafe and additional measure to provide directional information in the event of a GPS or power failure. The wearer may feel the position of directional sphere 1210 to orient themselves by knowing the direction of magnetic north. If the directional sphere 1210 has been displaced from its default position 1006, a simple shake will allow directional sphere 1210 to return to its default position 1006.

Figure 13:
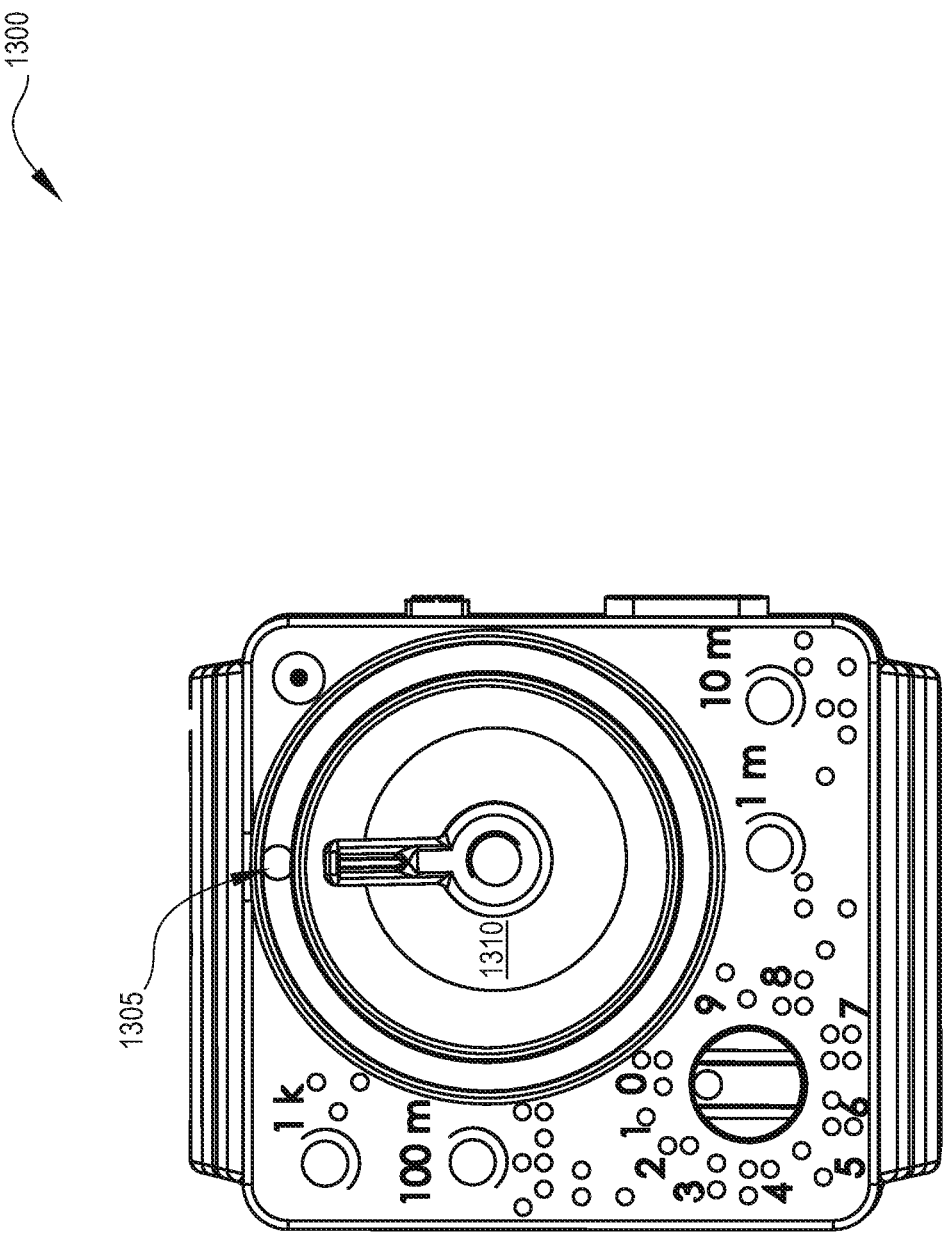
FIG. 13 depicts an exemplary view of a GPS swim watch with detail of directional sphere set at default position, in accordance with described embodiments.

FIG. 13 depicts an exemplary view of a GPS swim watch with detail of directional sphere set at default position, in accordance with described embodiments.

As depicted here, direction arm 1310 is oriented to default position 1305 indicating magnetic north.

FIGS. 14-21 depict an exemplary overview of programming a GPS swim watch.

Figure 14:
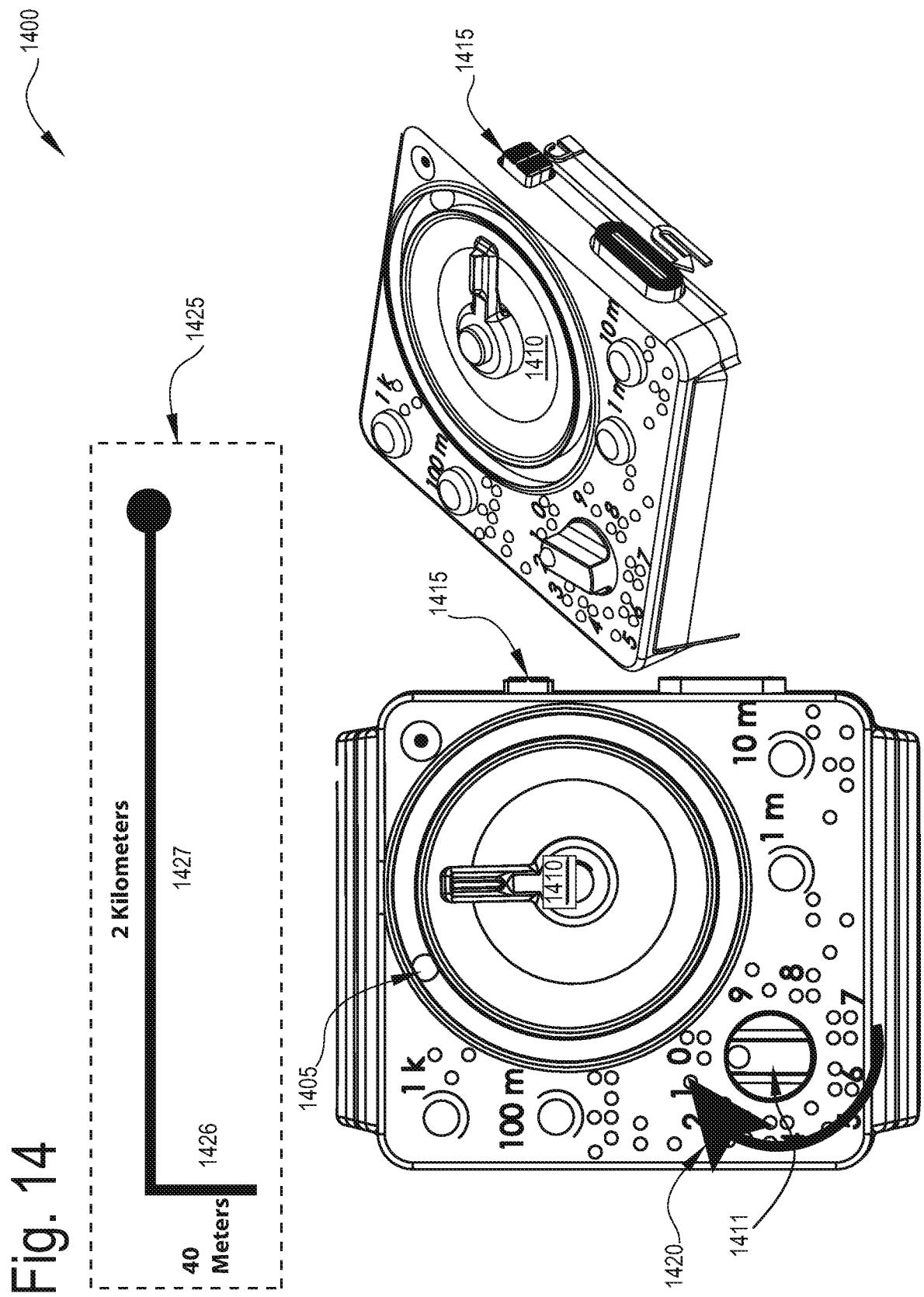
FIG. 14 depicts an exemplary view of programming a first segment of a desired route into a GPS swim watch, in accordance with described embodiments.

FIG. 14 depicts an exemplary view of programming a first segment of a desired route into a GPS swim watch, in accordance with described embodiments.

As depicted here, direction arm 1410 points in the magnetic north direction, although directional sphere 1405 has been displaced from its default (magnetic north) position. Nevertheless, the direction of the first segment 1426 of desired route 1425 has been set as north. The desired length of the first segment 1426 of desired route 1425 is 40 Meters. Thus, to program this distance into GPS swim watch 1400, lock button 1415 must be pressed once to unlock GPS swim watch 1400, and distance value knob 1411 must be reset 1420 back to the "0" value.

Figure 15:
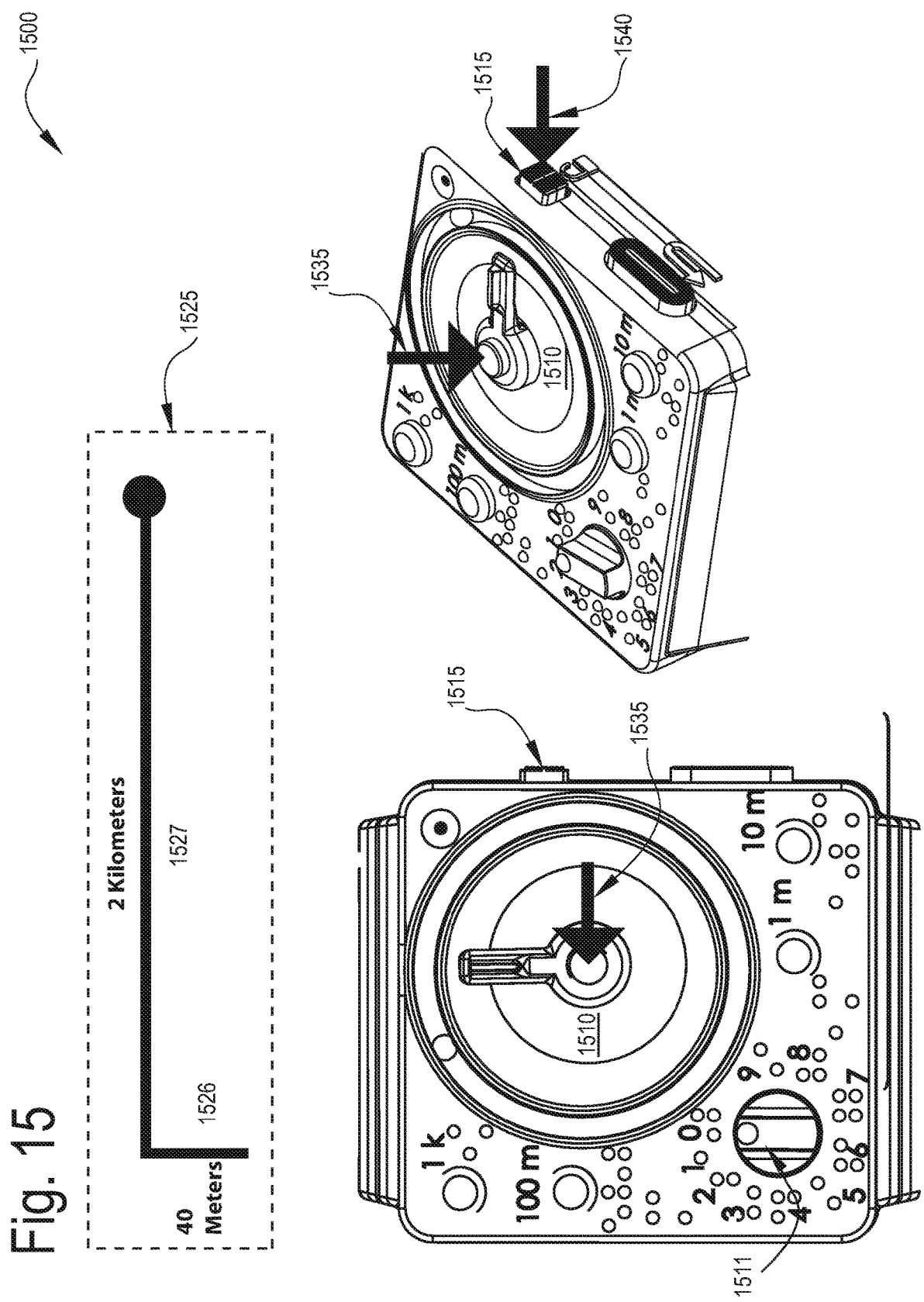
FIG. 15 further depicts an exemplary view of programming a first segment of a desired route into a GPS swim watch, in accordance with described embodiments.

FIG. 15 further depicts an exemplary view of programming a first segment of a desired route into a GPS swim watch, in accordance with described embodiments.

As depicted here, following the steps in FIG. 14, lock button 1515 is pressed 1540 to unlock GPS swim watch 1500 to allow for programming the first segment 1526 of a desired route 1525. Next, enter button of direction arm 1510 is pressed 1535 to set the orientation of first segment 1526 of desired route 1525 in the magnetic north direction to which direction arm 1510 points. Thus, the direction of the first segment 1426 of desired route 1425 has been set as north. Distance value knob 1511 has been reset 1420 back to the "0" value to allow for new programming.

Figure 16:
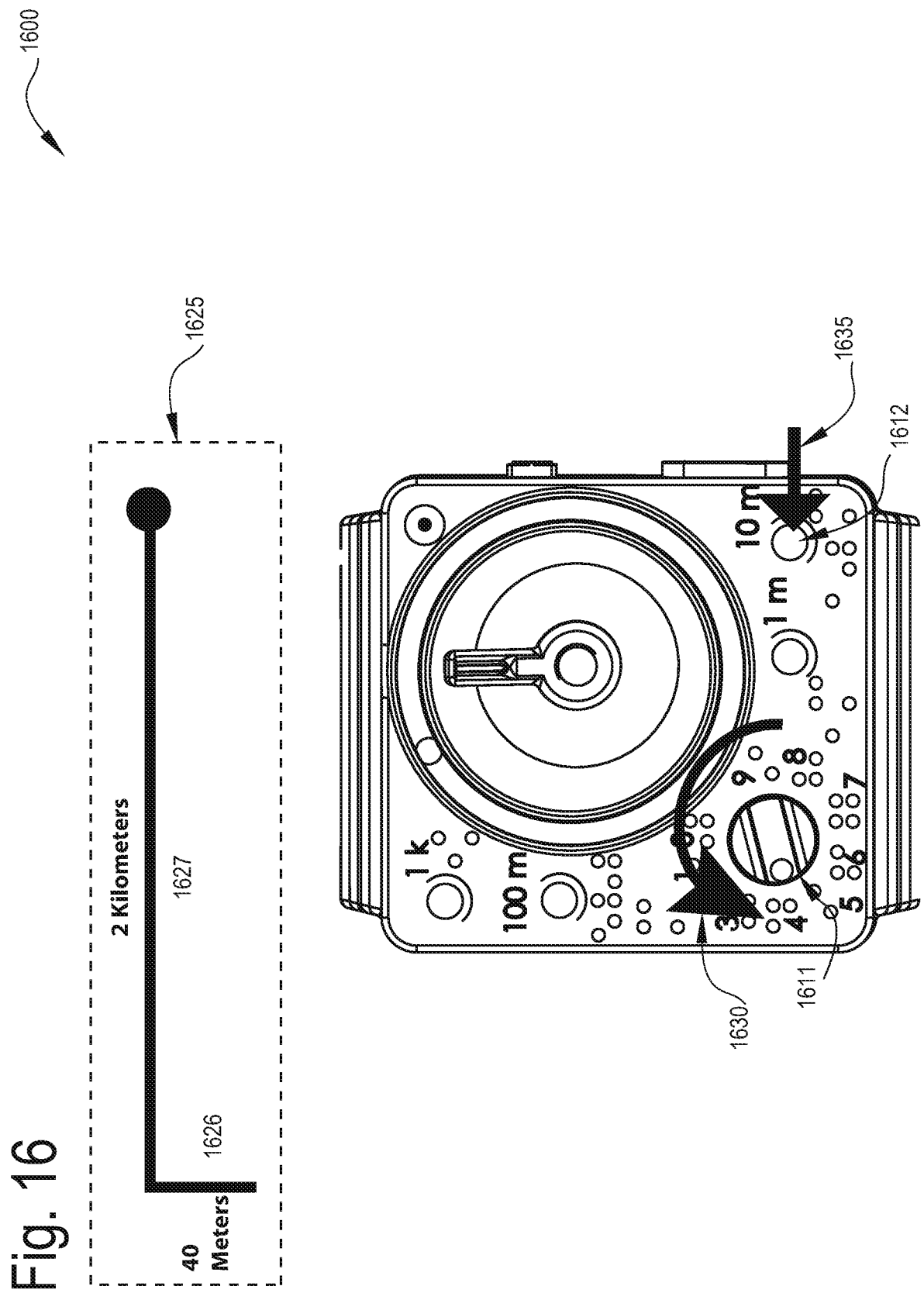
FIG. 16 further depicts an exemplary view of programming a first segment of a desired route into a GPS swim watch, in accordance with described embodiments.

FIG. 16 further depicts an exemplary view of programming a first segment of a desired route into a GPS swim watch, in accordance with described embodiments.

As depicted here, following the steps in FIG. 15, distance value knob 1611 has been set 1630 to the "4" value. The "4" value indicates the first digit of the desired length (40 Meters) of first segment 1626 of desired route 1625. Here, the "4" value indicates the first digit, which is also the tens place of the desired length (40 Meters) of first segment 1626 of desired route 1625. Next, 10 m distance value button 1612 is pressed 1635 to program the second digit ("0=ones place") of first segment 1626 of desired route 1625.

FIG. 17 further depicts an exemplary view of programming a first segment of a desired route into a GPS swim watch, in accordance with described embodiments.

As depicted here, following the steps in FIG. 16, enter button of directional arm 1710 is pressed 1735 to set the parameters programmed in FIGS. 14-16 for the direction and distance of first segment 1726 of desired route 1725.

Figure 18:
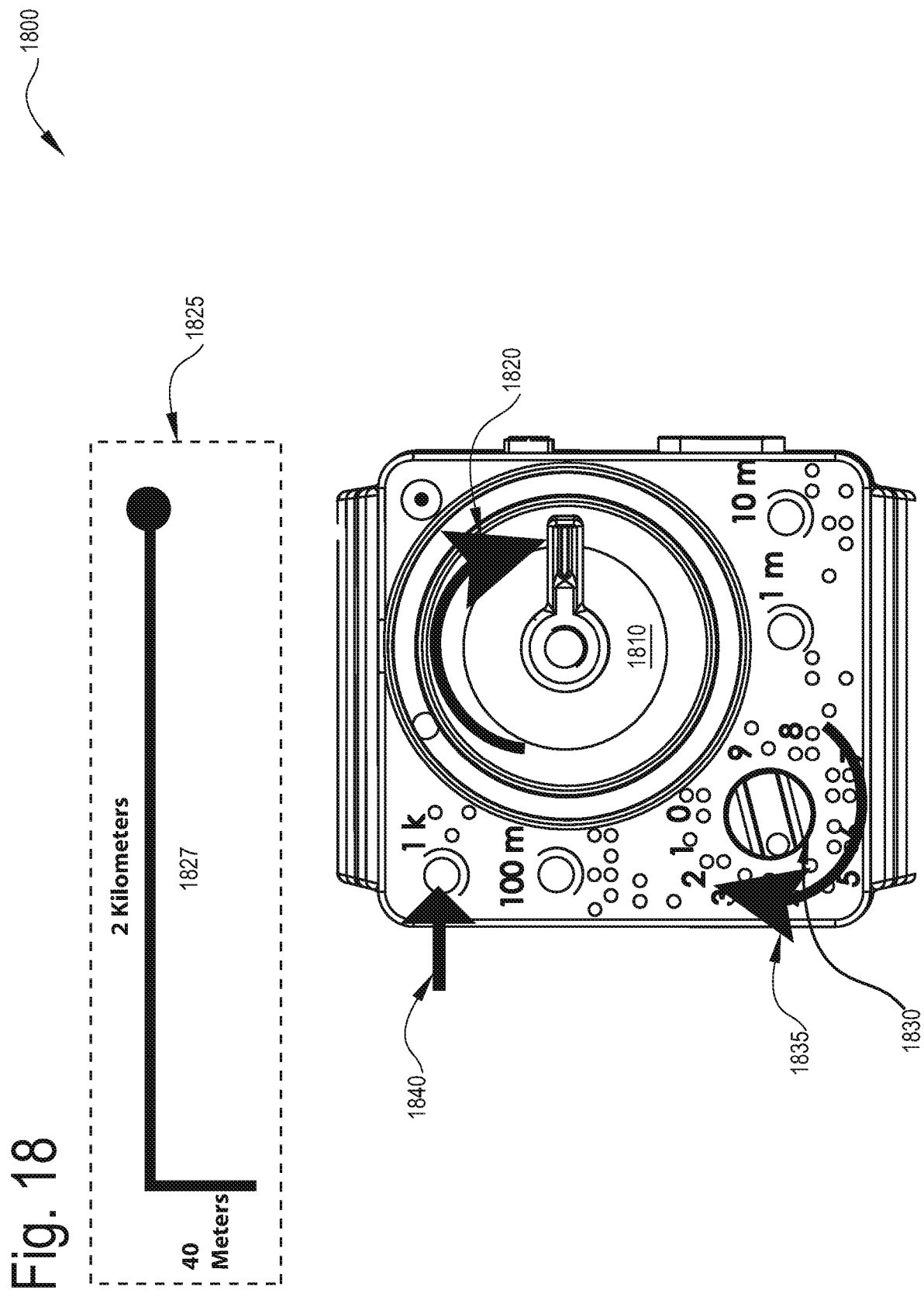
FIG. 18 depicts an exemplary view of programming a second segment of a desired route into a GPS swim watch, in accordance with described embodiments.

FIG. 18 depicts an exemplary view of programming a second segment of a desired route into a GPS swim watch, in accordance with described embodiments.

As depicted here, following the steps in FIGS. 14-17, the distance and orientation for second segment 1827 of desired route 1825 may be set. Directional arm 1810 is adjusted 1820 to due east (90 degree clockwise from magnetic north). 2 Kilometers, the distance for second segment 1827 of desired route 1825 is also set. Direction value knob 1830 is adjusted 1835 to "2" representing the first digit of 2 Kilometers. 1 k direction value button 1840 is pressed to indicate that the units for second segment 1827 of desired route 1825 are in kilometers.

FIG. 19 further depicts an exemplary view of programming a second segment of a desired route into a GPS swim watch, in accordance with described embodiments.

As depicted here, following the steps in FIG. 18, enter button of directional arm 1910 is pressed 1920 to set the parameters programmed in FIG. 18 for the direction and distance of second segment 1927 of desired route 1925.

FIG. 20 further depicts an exemplary view of programming a second segment of a desired route into a GPS swim watch, in accordance with described embodiments.

As depicted here, following the steps in FIGS. 18-19, lock button 2015 is pressed 2040 to lock the programmed parameters of desired route 2025.

FIG. 21 depicts an exemplary view of additional functions available for a programmed desired route into a GPS swim watch, in accordance with described embodiments.

As depicted here, following the steps in FIGS. 14-20 in which desired route 2125 has been programmed and locked into GPS swim watch 2100, lock button 2115 may be pressed 2140 to unlock programmed setting and modify parameters of desired route 2125 including modifying segments, distances and orientations of segments. Furthermore, return button may be pressed 2145 to reroute the user backwards along desired route 2125 towards starting point "A" 2128.

Figure 22A:
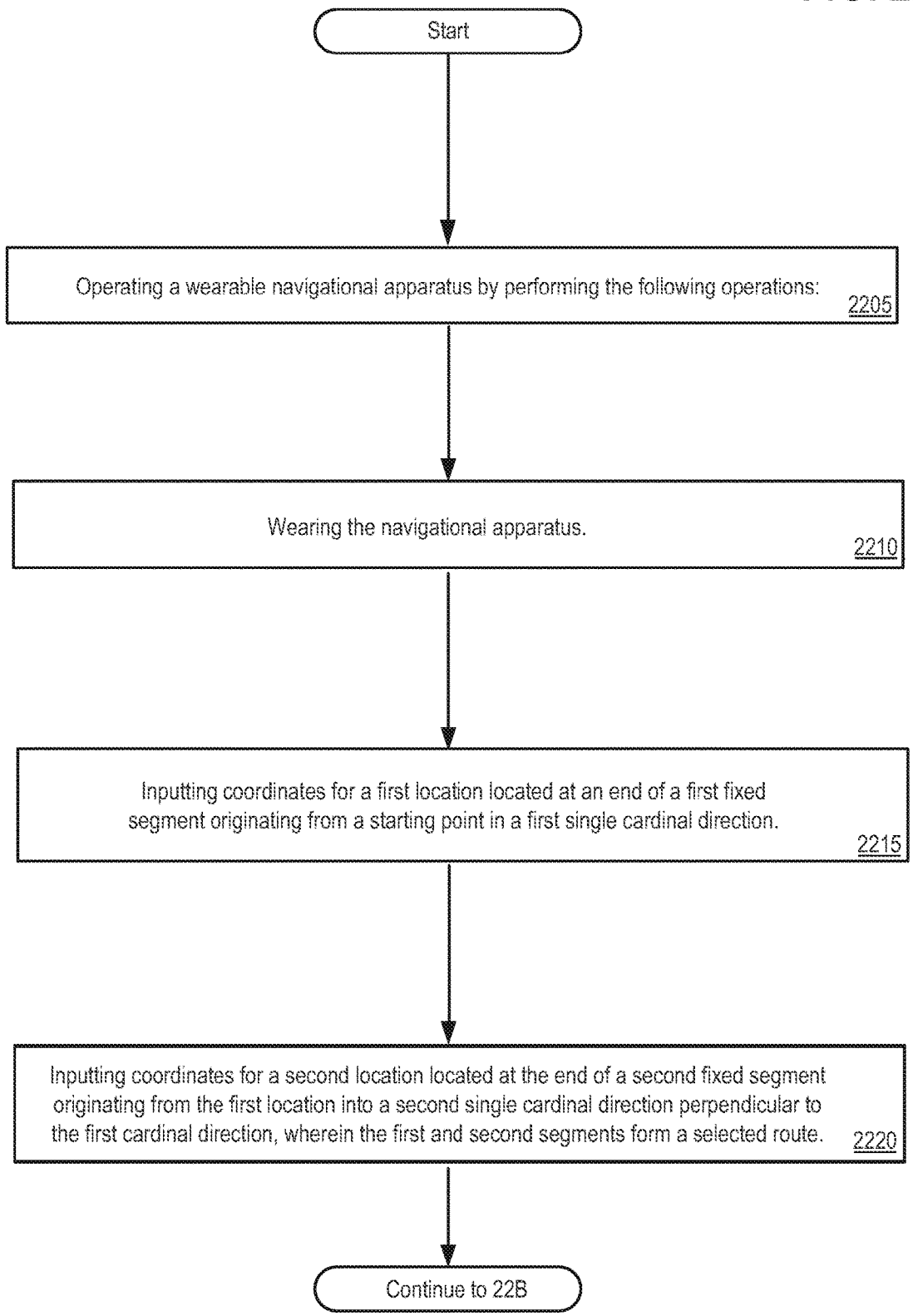
FIGS. 22A and 22B depict a flow diagram illustrating a method 2200 for operating a wearable navigational apparatus, in accordance with described embodiments.
Figure 22B:
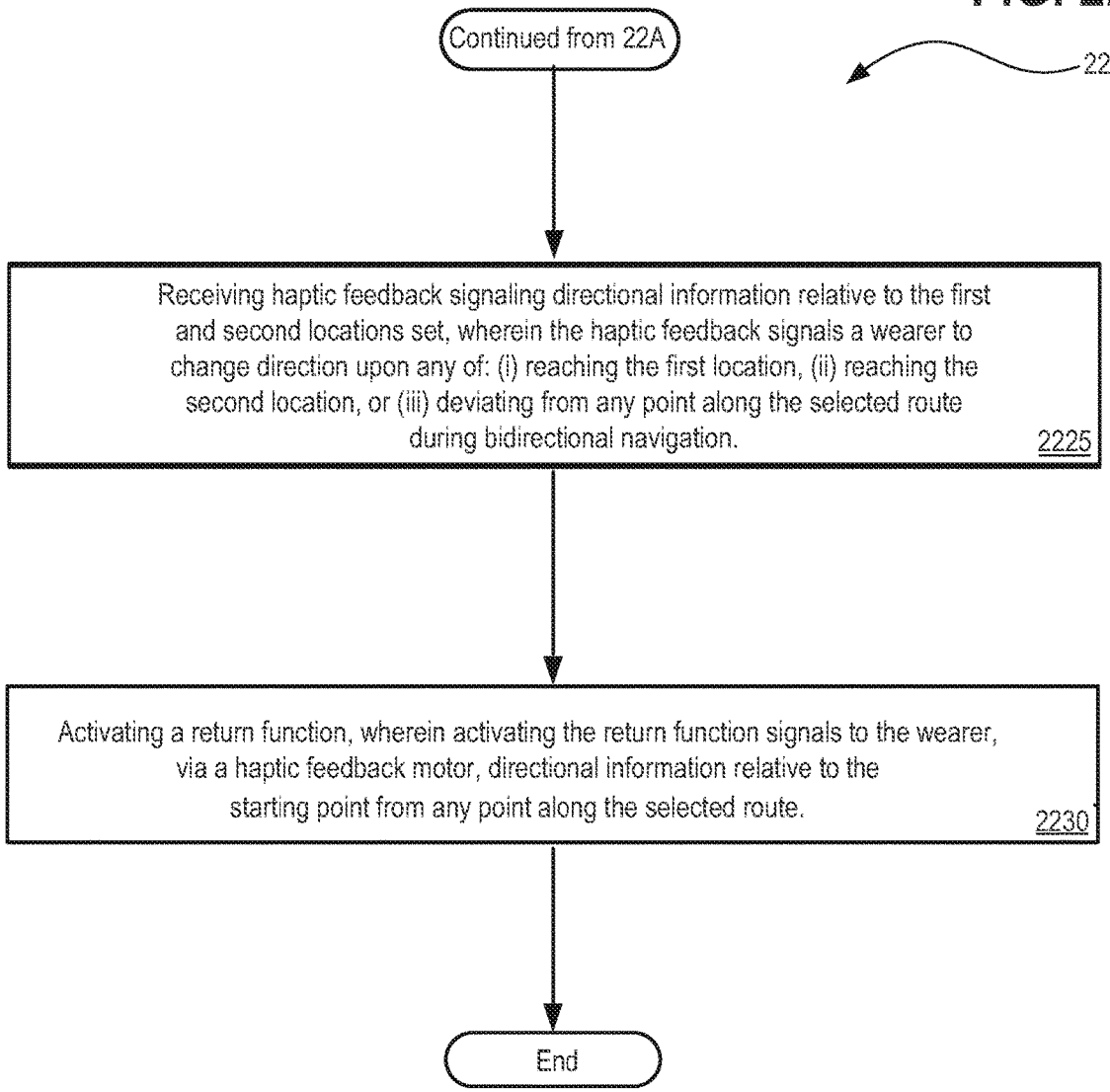

FIGS. 22A and 22B depict a flow diagram illustrating a method 2200 for operating a wearable navigational apparatus, in accordance with described embodiments.

Some of the blocks and/or operations listed below are optional in accordance with certain embodiments. The numbering of the blocks presented is for the sake of clarity and is not intended to prescribe an order of operations in which the various blocks must occur.

With reference to the method 2200 depicted at FIG. 22A beginning at block 2205, there is a method for operating a wearable navigational apparatus by performing the following operations:

At block 2210, the method includes wearing the navigational apparatus.

At block 2215, the method includes inputting coordinates for a first location located at an end of a first fixed segment originating from a starting point in a first single cardinal direction.

At block 2220, the method includes inputting coordinates for a second location located at the end of a second fixed segment originating from the first location into a second single cardinal direction perpendicular to the first cardinal direction, wherein the first and second segments form a selected route.

The method 2200 continues at FIG. 22B, continuing with block 2225, wherein the method further includes receiving haptic feedback signaling directional information relative to the first and second locations set, wherein the haptic feedback signals a wearer to change direction upon any of: (i) reaching the first location, (ii) reaching the second location, or (iii) deviating from any point along the selected route during bidirectional navigation.

At block 2230, the method further includes activating a return function, wherein activating the return function signals to the wearer, via a haptic feedback motor, directional information relative to the starting point from any location along the selected route.

According to another embodiment of method 2200, the wearable navigational apparatus embodies a GPS directional swim-watch that assists with navigation during aquatic activity, wherein aquatic activity includes one or more of: (i) recreational swimming, (ii) competitive swimming, (iii) swimming in pools, (iv) swimming in open waters, (v) water sports, and (vi) group aquatic exercise.

According to another embodiment of method 2200, the wearer is visually impaired, wherein the wearable navigational apparatus assists the wearer with one or more of: (i) navigation, (ii) performance, (iv) speed, and (v) emergency situations.

According to another embodiment of method 2200, the wearable navigational apparatus is used in one or more of: (i) hiking, (ii) running, (iii) jogging, (iv) marathons, (v) survival courses, (vi) hunting, (vii) fishing, (viii) cycling, (ix) motorsports, (x) driving, and (xi) aviation.

According to another embodiment of method 2200, bidirectional navigation includes one or more of: (i) traveling forwards along, (ii) traveling backwards along, or (iii) looping around the selected course.

According to another embodiment of method 2200, the wearer has deviated from any point along the selected route during bidirectional navigation, wherein the return function further comprises an initial course correction function to return the wearer back onto the selected route, wherein upon returning the wearer back onto the selected route, the return function further reverses navigation orientation of each fixed segment by 180 degrees to return the wearer to the starting point.

According to another embodiment of method 2200, the return function automatically navigates the wearer back to one or more of: (i) the starting point or (ii) a safety point via a shortest route, without regard to the selected course.

Imagine the situation where a wearer has deviated from the selected route and is lost in open waters. The wearer may not have the energy or ability to swim all the way back to the selected course and from there swim back to the starting point. Imagine further the challenge of accomplishing this when the wearer is visually impaired. Thus, being able to guide the wearer via the shortest route to the starting point or a safety point such as the nearest shore, rock, or watercraft is critical and can be life-saving.

According to another embodiment of method 2200, the wearable navigational apparatus has one or more remote navigation features, including: (i) GPS, (ii) satellite, (iii) Wi-Fi, and (iv) cloud-computing capabilities, wherein the wearable navigation apparatus can send and receive one or more of: (i) emergency communications, (ii) information about the wearer's location, and (iii) information about surrounding amenities and healthcare services.

According to another embodiment of method 2200, the magnetized compass serves as a failsafe upon failure of the remote navigation features.

This allows distressed wearers to still receive navigational information when connections to remote navigation features such as GPS fail. The wearer can still receive navigational information from the magnetized compass via feeling the directional sphere of the wearable navigational apparatus, as well as receiving haptic feedback from the wearable navigational apparatus.

According to another embodiment of method 2200, a third and subsequent location may be set.

According to another embodiment of method 2200, a directional sphere within a circular groove on the face of the wearable navigation apparatus represents a compass rose of the magnetized compass, wherein the magnetized compass is housed within a chassis of the wearable navigation apparatus, wherein the wearer synchronizes navigation of a present route by: (i) feeling a present degree orientation of the directional sphere within the compass rose, and (ii) aligning swimming direction according to the present degree orientation.

According to another embodiment of method 2200, the coordinates for the first and second locations may be reversibly locked and unlocked.

According to another embodiment of method 2200, the haptic feedback motor further signals one or more of: (i) directional information, (ii) lock/unlock status, (iii) return function status, (iv) location information, (v) distance information, and (vi) power status via one or more of: (a) audio cues, (b) vibration, (c) pulsation, and (d) visual cues.

None of the claims are intended to invoke paragraph six of 35 U.S.C. § 112 unless the exact words "means for" are followed by a participle. While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

Figure 23:
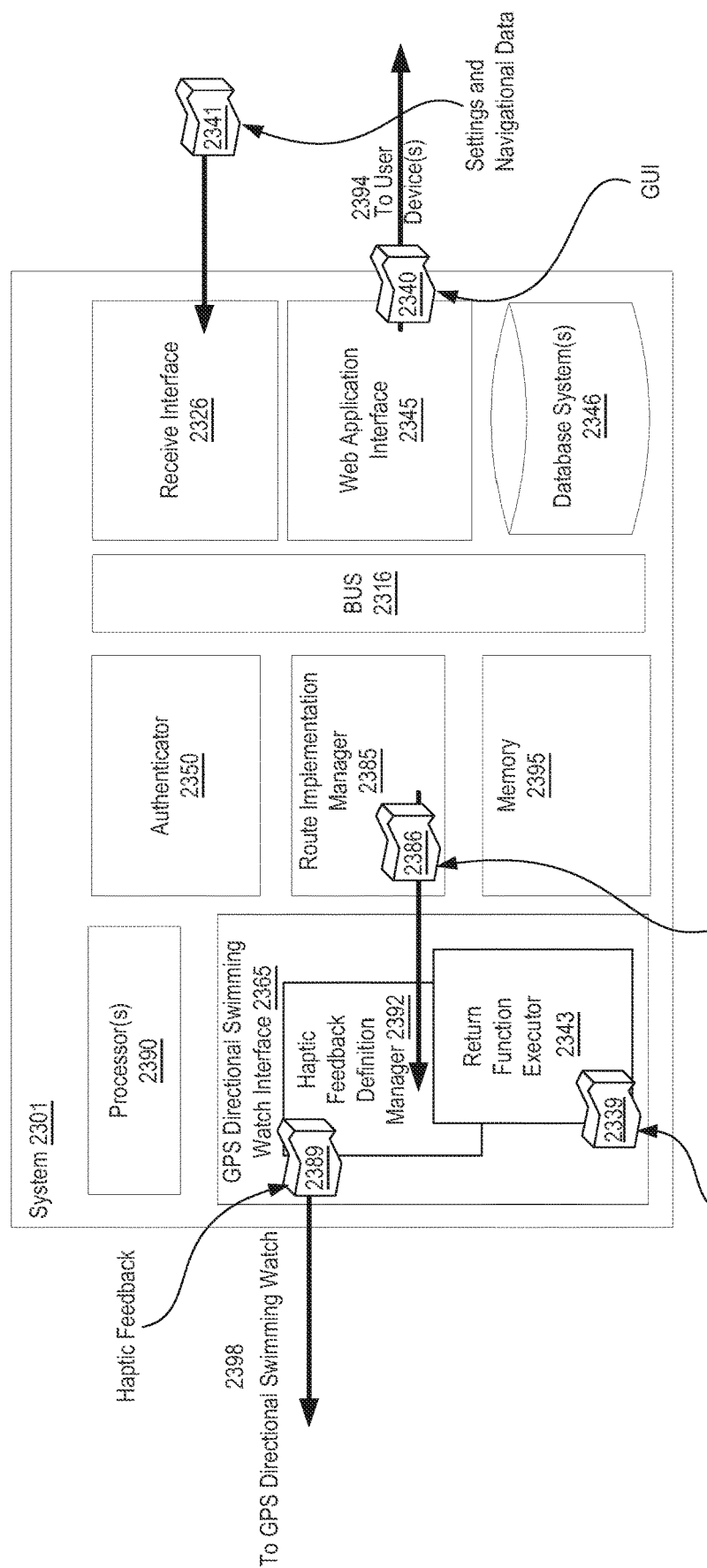
FIG. 23 shows a diagrammatic representation of a system 2301 within which embodiments may operate, be installed, integrated, or configured.

FIG. 23 shows a diagrammatic representation of a system 2301 within which embodiments may operate, be installed, integrated, or configured.

In accordance with one embodiment, there is a system 2301 having at least a processor 2390 and a memory 2395 therein to execute implementing application code for the methodologies as described herein. Such a system 2301 may communicatively interface with and cooperatively execute with the benefit of a hosted computing environment, such as a host organization, a multi-tenant environment, an on-demand service provider, a cloud-based service provider, a client-server environment, etc.

According to the depicted embodiment, system 2301, which may operate within a host organization, includes the processor 2390 and the memory 2395 to execute instructions at the system 2301. According to such an embodiment, the processor 2390 is to execute a GPS directional swimming watch interface 2365 to aid wearers with navigation while swimming. Internal to the GPS directional swimming watch interface 2365, there is depicted the haptic feedback definition manager 2392, depicted here as sending haptic feedback 2389 to the GPS directional swimming watch 2398 via the GPS directional swimming watch interface 2365 upon triggers for haptic feedback such as pre-configured changes in swimming direction or sensing that the wearer is deviating from the selected route.

A receive interface 2326 of the system 2301 is to receive settings and navigational data 2341 such as programmed swimming routes and real-time directional information, for example based on compass measurements. Such a system further includes database system(s) 2346 to store the settings and navigational data 2341 of the system 2301.

Settings and navigational data 2341 received at receive interface 2326 or stored within database system(s) 2346 may be accessed by or forwarded to route implementation manager 2385 which may implement navigation routes and send route and navigation related information to haptic feedback definition manager 2392.

Such a system 2301 further includes a return function command 2339, which may be manually activated via mechanical components of the GPS directional swimming watch. Return function command 2339 is executable via the processor 2390 and the return function executor 2343 which references return function protocol 2386 at route implementation manager 2385 to recalibrate each directional segment of the navigation route by 180 degrees before executing return function command 2339.

Once validated, return function command 2339 may be executed by sending a push notification to user devices 2394 associated with GPS directional swimming watch 2398, for example via a web application interface 2345 and GUI 2340.

According to such an embodiment of the system 2301, a GUI 2340 may be pushed to the user devices 2394 via which the user devices or admin computing devices may interact with the GPS directional swimming watch interface 2365.

According to another embodiment of the system 2301, the GPS directional swimming watch interface 2365 is to interact with and provide access to the GPS directional swimming watch 2398.

According to another embodiment of the system 2301, the receive interface 2326 communicates with a user client device 2394 remote from the system and communicatively links the user device with the system via a public Internet. According to such an embodiment, the system operates at a host organization as a cloud-based service provider to the user device 2394; in which the cloud-based service provider hosts a receive interface 2326 exposed to the user client device via the public Internet, and further in which the receive interface receives inputs from the user device as a request for services from the cloud-based service provider. GUIs may be transmitted to the user devices 2394 via the Web Application Interface 2345.

Bus 2316 interfaces the various components of the system 2301 amongst each other, with any other peripheral(s) of the system 2301, and with external components such as external network elements, other machines, client devices, cloud computing services, etc. Communications may further include communicating with external devices via a network interface over a LAN, WAN, or the public Internet. Authenticator 2350 provides authentication services for users seeking access to the database system(s) 2346, clouds, and other services of the host organization.

FIG. 24 illustrates a diagrammatic representation of a machine 2400 in the exemplary form of a computer system, in accordance with one embodiment, within which a set of instructions, for causing the machine/computer system 2400 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 2400 includes a processor 2402, a main memory 2404 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 2418 (e.g., a persistent storage device including hard disk drives and a persistent database and/or a multi-tenant database implementation), which communicate with each other via a bus 2430. Main memory 2404 includes a haptic feedback definition manager 2424 and a return function executor 2423. For instance, the return function executor 2423 operates to determine and execute the return route, including finding and routing the swimmer along the shortest route to a home location or an origination point or a start point, regardless of where the swimmer is along a pre-defined route or in the event of a route deviation event, then the return function executor 2423 operates to return the swimmer first to the nearest point on any known segment and then to the origination or start point. Alternatively, the return function executor 2423 may define a new segment or multiple new segments which are configured in-situ to route the swimmer to the origination point by the shortest distance permissible, without regard to any prior pre-defined route. Such a function may be important where the swimmer is lost or exhausted or otherwise wishes to return to the safety of the starting point (e.g., along the beach, dock, etc.) without completing any previously configured route or route segments. Further included here is the route implementation manager 2425 which operates to execute the required segments in fulfillment of a route and collaboratively operate with the aid of the haptic feedback definition manager to issue beeps, vibrations, taps, or other sensory inputs to the swimmer so as to direct the swimmer along the pre-defined route segments or when needed, to re-direct the swimmer back onto a route segment in the event the swimmer deviates or otherwise veers off of the pre-defined route. Main memory 2404 and its sub-elements are operable in conjunction with processing logic 2426 and processor 2402 to perform the methodologies discussed herein.

Processor 2402 represents one or more general-purpose processing devices such as a microprocessor, central processing unit, or the like. More particularly, the processor 2402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 2402 may also be one or more special-purpose processing devices such as an application specific integrated circuit (ASIC), a field programmable gate array (FPGA), a digital signal processor (DSP), network processor, or the like. Processor 2402 is configured to execute the processing logic 2426 for performing the operations and functionality which is discussed herein.

The computer system 2400 may further include a network interface card 2408. The computer system 2400 also may include a user interface 2410 (such as a video display unit, a liquid crystal display, etc.), an alphanumeric input device 2412 (e.g., a keyboard), a cursor control device 2414 (e.g., a mouse), and a signal generation device 2416 (e.g., an integrated speaker). The computer system 2400 may further include peripheral device 2436 (e.g., wireless or wired communication devices, memory devices, storage devices, audio processing devices, video processing devices, etc.).

The secondary memory 2418 may include a non-transitory machine-readable storage medium or a non-transitory computer readable storage medium or a non-transitory machine-accessible storage medium 2431 on which is stored one or more sets of instructions (e.g., software 2422) embodying any one or more of the methodologies or functions described herein. The software 2422 may also reside, completely or at least partially, within the main memory 2404 and/or within the processor 2402 during execution thereof by the computer system 2400, the main memory 2404 and the processor 2402 also constituting machine-readable storage media. The software 2422 may further be transmitted or received over a network 2420 via the network interface card 2408.

According to a specific embodiment, the system 1000 embodies implements a wearable navigational apparatus, having at least the following elements integrated therein: a mechanical input to receive coordinates for a first location located at an end of a first fixed segment originating from a starting point in a first single cardinal direction; a mechanical input to receive coordinates for a second location located at the end of a second fixed segment originating from the first location in a second single cardinal direction perpendicular to the first cardinal direction, wherein the first and second fixed segments form a selected route; a haptic feedback motor having a magnetized compass integrated therein to signal to a wearer directional information relative to the first and second locations set, wherein the haptic feedback motor signals the wearer to change direction upon any of: (i) reaching the first location, (ii) reaching the second location, or (iii) deviating from any point along the selected route during bidirectional navigation; and a return function to signal to the wearer, via the haptic feedback motor, directional information relative to the starting point from any point along the selected course.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the invention is therefore determined in reference to the appended claims, along with the full scope of equivalents to which such claims are entitled.

What is claimed is:

1. A wearable navigational apparatus, comprising:
   a mechanical input to receive coordinates for a first location located at an end of a first fixed segment originating from a starting point in a first single cardinal direction;
   a mechanical input to receive coordinates for a second location located at the end of a second fixed segment originating from the first location in a second single cardinal direction perpendicular to the first cardinal direction, wherein the first and second fixed segments form a selected route;
   a haptic feedback motor having a magnetized compass integrated therein to signal to a wearer directional information relative to the first and second locations set, wherein the haptic feedback motor signals the wearer to change direction upon any of: (i) reaching the first location, (ii) reaching the second location, or (iii) deviating from any point along the selected route during bidirectional navigation; and
   a return function to signal to the wearer, via the haptic feedback motor, directional information relative to the starting point from any point along the selected course.

2. The wearable navigational apparatus of claim 1, wherein the wearable navigational apparatus embodies a GPS directional swim-watch that assists with navigation during aquatic activity, wherein aquatic activity includes one or more of: (i) recreational swimming, (ii) competitive swimming, (iii) swimming in pools, (iv) swimming in open waters, (v) water sports, and (vi) group aquatic exercise.

3. The wearable navigational apparatus of claim 2, wherein the wearer is visually impaired, wherein the wearable navigational apparatus assists the wearer with one or more of: (i) navigation, (ii) performance, (iv) speed, and (v) emergency situations.

4. The wearable navigational apparatus of claim 1, wherein the wearable navigational apparatus is used in one or more of: (i) hiking, (ii) running, (iii) jogging, (iv) marathons, (v) survival courses, (vi) hunting, (vii) fishing, (viii) cycling, (ix) motorsports, (x) driving, and (xi) aviation.

5. The wearable navigational apparatus of claim 1, wherein bidirectional navigation includes one or more of: (i) traveling forwards along, (ii) traveling backwards along, or (iii) looping around the selected course.

6. The wearable navigational apparatus of claim 1, wherein the wearer has deviated from any point along the selected route during bidirectional navigation, wherein the return function further comprises an initial course correction function to return the wearer back onto the selected route, wherein upon returning the wearer back onto the selected route, the return function further reverses navigation orientation of each fixed segment by 180 degrees to return the wearer to the starting point.

7. The wearable navigational apparatus of claim 6, wherein the return function automatically navigates the wearer back to one or more of: (i) the starting point or (ii) a safety point via a shortest route, without regard to the selected course.

8. The wearable navigational apparatus of claim 1, wherein the wearable navigational apparatus has one or more remote navigation features, including: (i) GPS, (ii) satellite, (iii) Wi-Fi, and (iv) cloud-computing capabilities, wherein the wearable navigation apparatus can send and receive one or more of: (i) emergency communications, (ii) information about the wearer's location, and (iii) information about surrounding amenities and healthcare services.

9. The wearable navigational apparatus of claim 8, wherein the magnetized compass serves as a failsafe upon failure of the remote navigation features.

10. The wearable navigational apparatus of claim 1, wherein a third and subsequent location may be set.

11. The wearable navigational apparatus of claim 1, wherein a directional sphere within a circular groove on the face of the wearable navigation apparatus represents a compass rose of the magnetized compass, wherein the magnetized compass is housed within a chassis of the wearable navigation apparatus, wherein the wearer synchronizes navigation of a present route by: (i) feeling a present degree orientation of the directional sphere within the compass rose, and (ii) aligning swimming direction according to the present degree orientation.

12. The wearable navigational apparatus of claim 1, wherein the coordinates for the first and second locations may be reversibly locked and unlocked.

13. The wearable navigational apparatus of claim 1, wherein the haptic feedback motor further signals one or more of: (i) directional information, (ii) lock/unlock status, (iii) return function status, (iv) location information, (v) distance information, and (vi) power status via one or more of: (a) audio cues, (b) vibration, (c) pulsation, and (d) visual cues.

14. A method for operating a wearable navigational apparatus, wherein the method comprises the following operations:
   wearing the navigational apparatus;
   inputting coordinates for a first location located at an end of a first fixed segment originating from an starting point in a first single cardinal direction;
   inputting coordinates for a second location located at the end of a second fixed segment originating from the first location in a second single cardinal direction perpendicular to the first cardinal direction, wherein the first and second segments form a selected route;
   receiving, via a haptic feedback motor integrated with a magnetized compass, haptic feedback signaling directional information relative to the first and second locations set, wherein the haptic feedback signals a wearer to change direction upon any of: (i) reaching the first location, (ii) reaching the second location, or (iii) deviating from any point along the selected route during bidirectional navigation; and
   activating a return function, wherein activating the return function signals to the wearer, via the haptic feedback motor, directional information relative to the starting point from any point along the selected route.

15. The method of claim 14:
   wherein the wearable navigational apparatus embodies a GPS directional swim-watch that assists with navigation during aquatic activity, wherein aquatic activity includes one or more of: (i) recreational swimming, (ii) competitive swimming, (iii) swimming in pools, (iv)

swimming in open waters, (v) water sports, and (vi) group aquatic exercise; and wherein the wearer is visually impaired, wherein the wearable navigational apparatus assists the wearer with one or more of: (i) navigation, (ii) performance, (iv) speed, and (v) emergency situations.

16. The method of claim 14, wherein the wearable navigational apparatus is used in one or more of: (i) hiking, (ii) running, (iii) jogging, (iv) marathons, (v) survival courses, (vi) hunting, (vii) fishing, (viii) cycling, (ix) motorsports, (x) driving, and (xi) aviation.

17. The method of claim 14, wherein bidirectional navigation includes one or more of: (i) traveling forwards along, (ii) traveling backwards along, or (iii) looping around the selected course.

18. The method of claim 14:

wherein the wearer has deviated from any point along the selected route during bidirectional navigation, wherein the return function further comprises an initial course correction function to return the wearer back onto the selected route, wherein upon returning the wearer back onto the selected route, the return function further reverses navigation orientation of each fixed segment by 180 degrees to return the wearer to the starting point; and wherein the return function automatically navigates the wearer back to one or more of: (i) the starting point or (ii) a safety point via a shortest route, without regard to the selected course.

19. The method of claim 14:

wherein the wearable navigational apparatus has one or more remote navigation features, including: (i) GPS, (ii) satellite, (iii) Wi-Fi, and (iv) cloud-computing capabilities, wherein the wearable navigation apparatus can send and receive one or more of: (i) emergency communications, (ii) information about the wearer's location, and (iii) information about surrounding amenities and healthcare services; and wherein the magnetized compass serves as a failsafe upon failure of the remote navigation features.

20. The method of claim 14:

wherein a third and subsequent location may be set; and wherein a directional sphere within a circular groove on the face of the wearable navigation apparatus represents a compass rose of the magnetized compass, wherein the magnetized compass is housed within a chassis of the wearable navigation apparatus, wherein the wearer synchronizes navigation of a present route by: (i) feeling a present degree orientation of the directional sphere within the compass rose, and (ii) aligning swimming direction according to the present degree orientation.

* * * * *